United States Patent
Sugita

(10) Patent No.: US 10,545,320 B2
(45) Date of Patent: Jan. 28, 2020

(54) ZOOM LENS AND IMAGE PICKUP APPARATUS INCLUDING THE SAME

(71) Applicant: CANON KABUSHIKI KAISHA, Tokyo (JP)

(72) Inventor: Shigenobu Sugita, Shimotsuke (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/581,360

(22) Filed: Apr. 28, 2017

(65) Prior Publication Data

US 2017/0322399 A1  Nov. 9, 2017

(30) Foreign Application Priority Data

May 6, 2016 (JP) ................................. 2016-093106

(51) Int. Cl.
  *G02B 15/163* (2006.01)
  *G02B 15/20* (2006.01)
  *G02B 27/64* (2006.01)

(52) U.S. Cl.
  CPC ........... *G02B 15/163* (2013.01); *G02B 15/20* (2013.01); *G02B 27/646* (2013.01)

(58) Field of Classification Search
  CPC ...... G02B 13/04; G02B 13/0045; G02B 9/64; G02B 9/62; G02B 15/155; G02B 27/646; G02B 27/64; G02B 13/009; G02B 15/163; G02B 15/173; G02B 15/20; G03B 2205/0007; H04N 5/23248; H04N 5/23264
  USPC ....... 359/554, 557, 813, 676, 680, 681, 683, 359/684, 750, 751, 754, 755, 756, 757, 359/758
  See application file for complete search history.

(56) References Cited

U.S. PATENT DOCUMENTS

| | | | |
|---|---|---|---|
| 6,061,180 A * | 5/2000 | Hayakawa | G02B 15/173 359/557 |
| 9,110,278 B2 | 8/2015 | Sugita | |
| 9,250,424 B2 | 2/2016 | Sugita | |
| 9,268,118 B2 | 2/2016 | Sugita | |
| 9,268,119 B2 | 2/2016 | Sugita | |
| 9,465,203 B2 | 10/2016 | Sugita | |

(Continued)

FOREIGN PATENT DOCUMENTS

| | | |
|---|---|---|
| JP | 2005-242015 A | 9/2005 |
| JP | 2010-015003 A | 1/2010 |
| JP | 2012-141555 A | 7/2012 |

*Primary Examiner* — Evan P Dzierzynski
*Assistant Examiner* — Alberto J Betancourt
(74) *Attorney, Agent, or Firm* — Carter, DeLuca & Farrell LLP

(57) ABSTRACT

Provided is a zoom lens, including, in order from an object side to an image side: a first lens unit having a positive refractive power; a second lens unit having a negative refractive power; a third lens unit having a positive refractive power; a fourth lens unit having a positive refractive power; a fifth lens unit having a negative refractive power; and a rear lens group including one or more lens units, in which the third lens unit is configured to move toward the object side during zooming from a wide angle end to a telephoto end, in which an interval between adjacent lens units is changed during zooming, in which the fourth lens unit is moved in a direction having a vertical component to an optical axis during image stabilization, and in which focal lengths of the third and fourth lens units are appropriately set.

16 Claims, 17 Drawing Sheets

(56) References Cited

U.S. PATENT DOCUMENTS

| | | | |
|---|---|---|---|
| 9,575,391 B2 | 2/2017 | Sugita | |
| 9,638,904 B2 | 5/2017 | Sugita | |
| 2006/0119939 A1* | 6/2006 | Misaka | G02B 15/173 359/557 |
| 2006/0268428 A1* | 11/2006 | Kuroda | G02B 15/173 359/693 |
| 2010/0220400 A1* | 9/2010 | Yamamoto | G02B 15/173 359/690 |
| 2013/0120640 A1* | 5/2013 | Taki | G02B 15/14 348/345 |
| 2014/0211029 A1* | 7/2014 | Okumura | G02B 15/173 348/208.11 |
| 2014/0240554 A1* | 8/2014 | Uchida | G02B 15/22 348/240.99 |
| 2014/0362259 A1* | 12/2014 | Yamada | G02B 15/22 348/240.3 |
| 2016/0018630 A1* | 1/2016 | Ori | G02B 15/173 359/557 |
| 2016/0131879 A1 | 5/2016 | Sugita | |
| 2016/0209632 A1* | 7/2016 | Imaoka | G02B 15/177 |
| 2017/0242228 A1 | 8/2017 | Sugita | |

* cited by examiner

ZOOM LENS AND IMAGE PICKUP APPARATUS INCLUDING THE SAME

BACKGROUND OF THE INVENTION

Field of the Invention

The present invention relates to a zoom lens and an image pickup apparatus including the same, which are suitable for an image pickup optical system to be used in an image pickup apparatus, such as a digital camera, a video camera, a broadcasting camera, a monitoring camera, or a silver-halide film camera.

Description of the Related Art

In recent years, image pickup apparatus have increased in functionality. Accordingly, as image pickup optical systems to be used in the image pickup apparatus, zoom lenses having a high magnification ratio and high optical performance over the entire zoom range are sought for. Further, the zoom lenses are demanded to have an image stabilization function.

Hitherto known positive-lead type zoom lenses, in which a lens unit having a positive refractive power is arranged closest to an object side, include a zoom lens configured to correct an image blur by a part of lens units constructing the zoom lens. In Japanese Patent Application Laid-Open No. 2010-015003, there is disclosed a magnification optical system including, in order from an object side to an image side, a first lens unit to a fifth lens unit having positive, negative, positive, negative, and positive refractive powers, in which the fourth lens unit is configured to move to correct an image blur.

Further, in Japanese Patent Application Laid-Open No. 2005-242015, there is disclosed a zoom lens including, in order from an object side to an image side, a first lens unit to a sixth lens unit having positive, negative, positive, positive, negative, and positive refractive powers, in which the fifth lens unit is configured to move to correct an image blur. In Japanese Patent Application Laid-Open No. 2012-141555, there is disclosed a zoom lens including, in order from an object side to an image side, a first lens unit to a fifth lens unit having positive, negative, positive, negative, and positive refractive powers, in which a part of the fourth lens unit is configured to move to correct an image blur.

In order to achieve a positive-lead type zoom lens that is compact as a whole, has a high zoom ratio and high optical performance over the entire zoom range, and maintains the high optical performance during image stabilization, it is important to appropriately set each element constructing the zoom lens. In order to maintain the high optical performance during image stabilization, it is especially important to appropriately select a lens unit for image stabilization and set the refractive power of that lens unit, for example.

When an image blur is corrected in the above-mentioned five-unit zoom lens by the fourth lens unit having a negative refractive power, or an image blur is corrected in the above-mentioned six-unit zoom lens by the fifth lens unit having a negative refractive power, the image stabilization sensitivity of the lens unit for image stabilization increases as a zoom ratio increases. Then, the lens unit is required to be moved precisely during image stabilization, with the result that it is quite difficult to satisfactorily correct an image blur.

Meanwhile, in Japanese Patent Application Laid-Open No. 2012-141555, there is disclosed a zoom lens in which a fourth lens unit having a negative refractive power is divided into two lens sub units having a negative refractive power, and an image blur is corrected by one of the lens sub units. With this method, the image stabilization sensitivity is easily reduced. However, because the lens unit having a negative refractive power is divided into the two lens sub units, the thickness of the lens unit increases, and it is difficult to secure a space for movement of the fourth lens unit having a negative refractive power during zooming, resulting in a difficulty to obtain a high zoom ratio while decreasing the entire system in size.

SUMMARY OF THE INVENTION

The present invention has an object to provide a zoom lens that is compact as a whole, has a high zoom ratio, and easily maintains high optical performance during image stabilization, and an image pickup apparatus including the zoom lens.

According to an embodiment of the present invention, there is provided a zoom lens, comprising, in order from an object side to an image side: a first lens unit having a positive refractive power; a second lens unit having a negative refractive power; a third lens unit having a positive refractive power; a fourth lens unit having a positive refractive power; a fifth lens unit having a negative refractive power; and a rear lens group including one or more lens units, in which the third lens unit is configured to move toward the object side during zooming from a wide angle end to a telephoto end, in which an interval between each pair of adjacent lens units is changed during zooming, in which the fourth lens unit is configured to move in a direction having a vertical component with respect to an optical axis during image stabilization, and in which the following conditional expression is satisfied:

$$1.2 < f4/f3 < 3.0,$$

where f3 represents a focal length of the third lens unit, and f4 represents a focal length of the fourth lens unit.

Further features of the present invention will become apparent from the following description of exemplary embodiments with reference to the attached drawings.

DESCRIPTION OF THE EMBODIMENTS

Now, exemplary embodiments of the present invention are described with reference to the attached drawings. The zoom lens according to the present invention includes, in order from an object side to an image side: a first lens unit having a positive refractive power; a second lens unit having a negative refractive power; a third lens unit having a positive refractive power; a fourth lens unit having a positive refractive power; a fifth lens unit having a negative refractive power; and a rear lens group including one or more lens units. The third lens unit is configured to move toward the object side during zooming from a wide angle end (short focal length end) to a telephoto end (long focal length end), and an interval between each pair of adjacent lens units is changed during zooming. The fourth lens unit is configured to move in a direction having a vertical component with respect to an optical axis during image stabilization.

Figure 1:
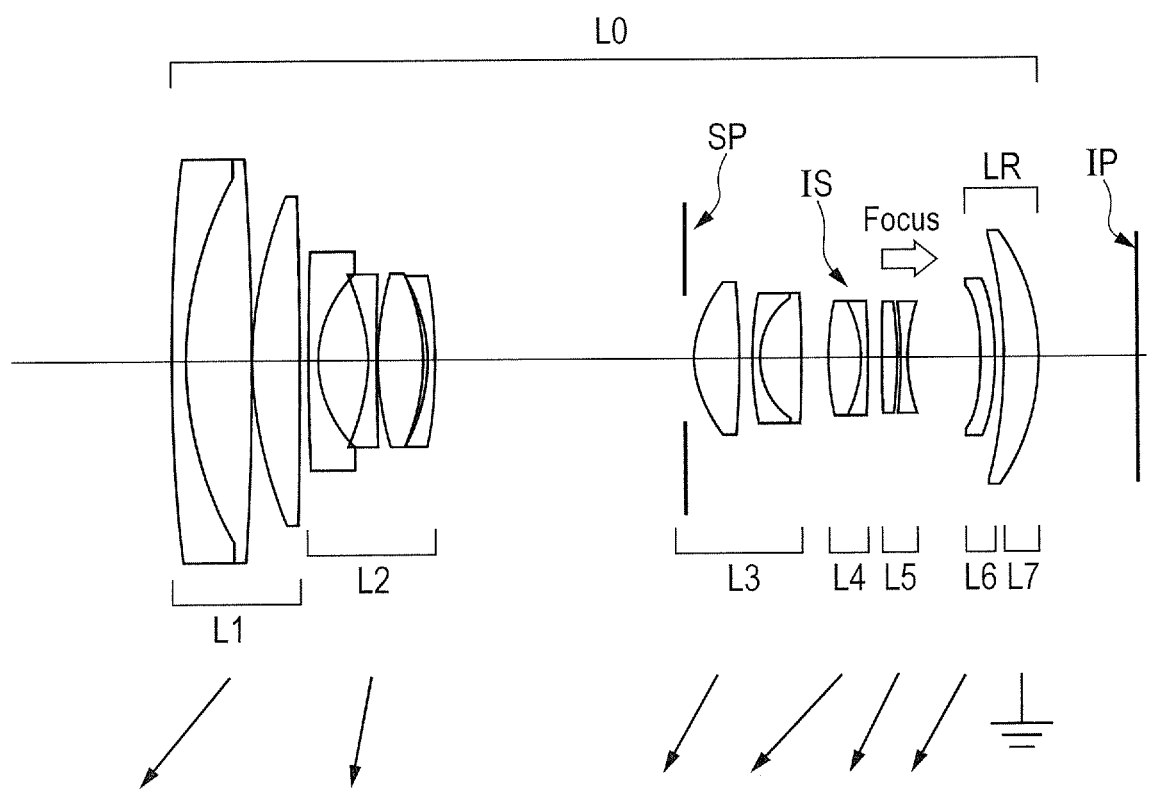
FIG. 1 is a lens cross-sectional view of a zoom lens according to Embodiment 1 of the present invention.
Figure 2A:
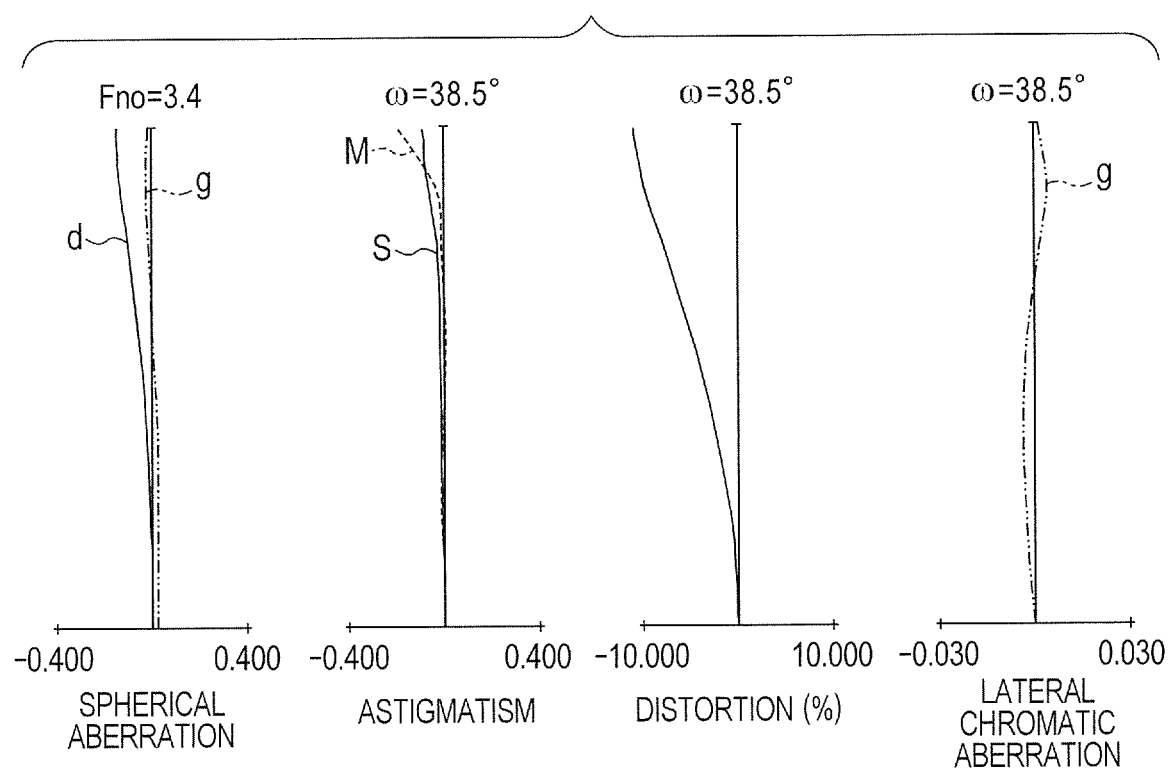
FIG. 2A is longitudinal aberration diagrams of the zoom lens of Embodiment 1 when focused at infinity at a wide angle end.
Figure 2B:
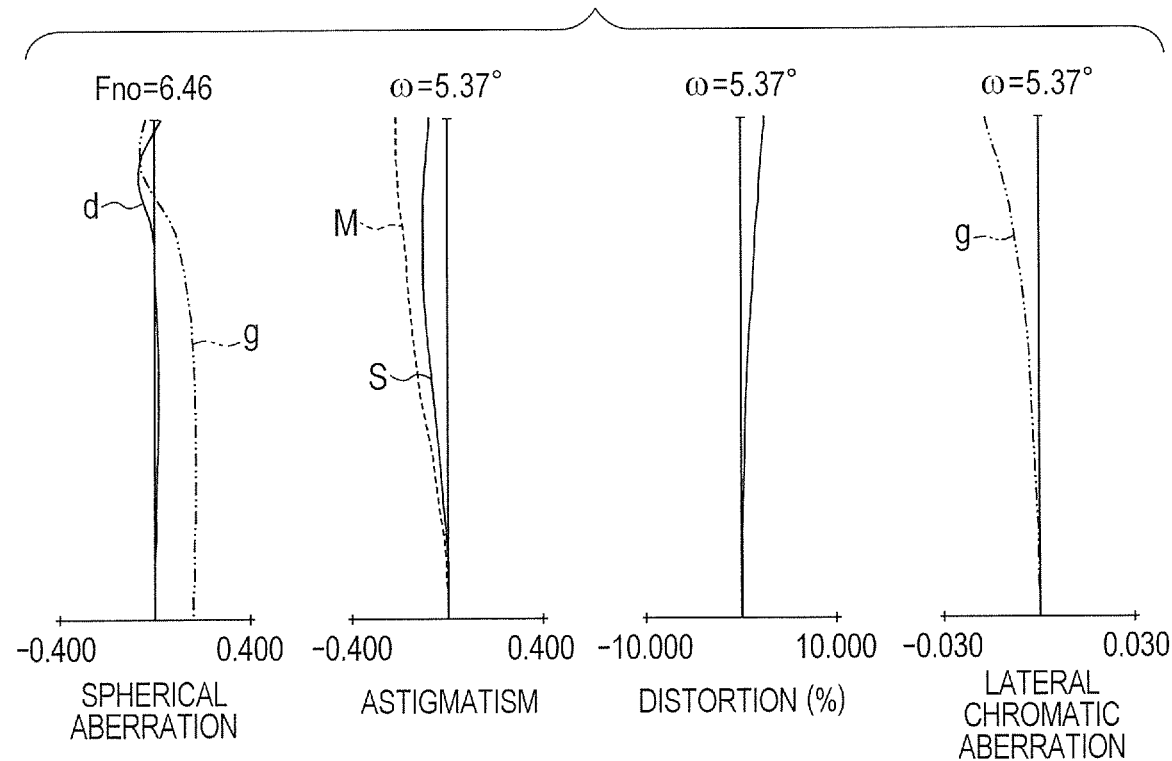
FIG. 2B is longitudinal aberration diagrams of the zoom lens of Embodiment 1 when focused at infinity at a telephoto end.
Figure 3A:
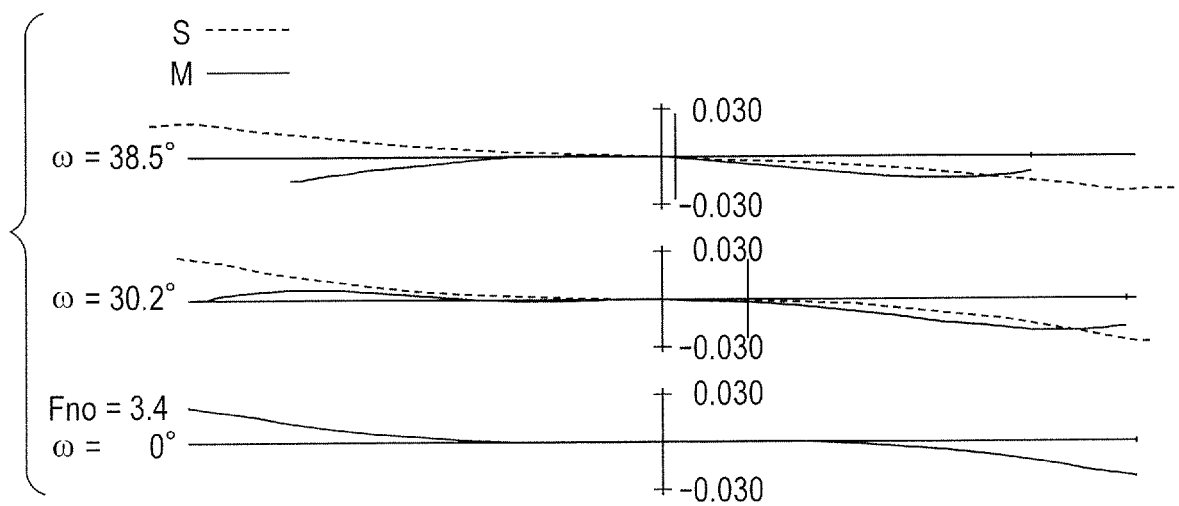
FIG. 3A is lateral aberration diagrams of the zoom lens of Embodiment 1 when focused at infinity at the wide angle end.
Figure 3B:
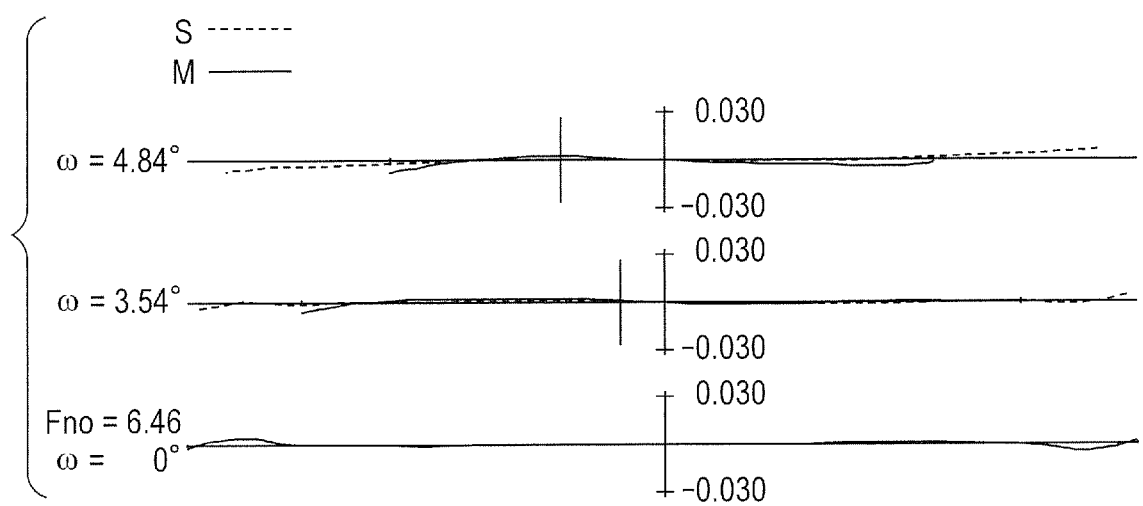
FIG. 3B is lateral aberration diagrams of the zoom lens of Embodiment 1 when focused at infinity at the telephoto end.
Figure 4A:
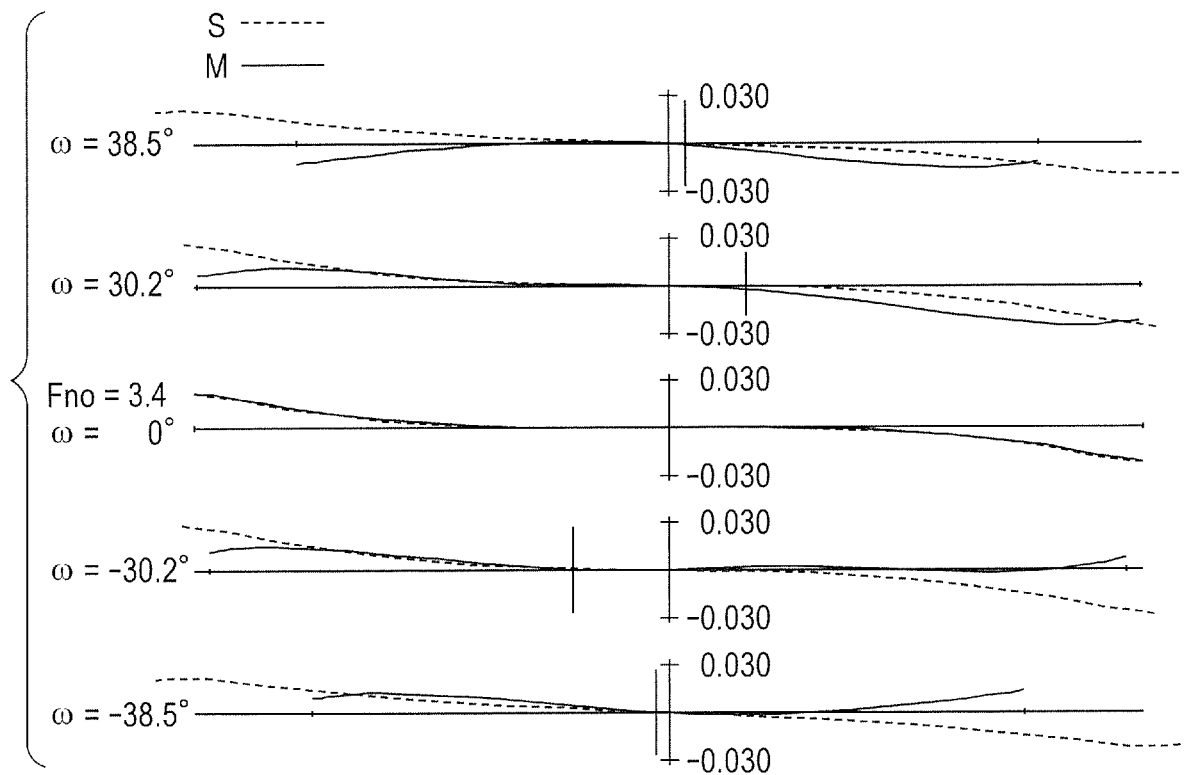
FIG. 4A is aberration diagrams of the zoom lens of Embodiment 1 with image stabilization for 0.3 degrees when focused at infinity at the wide angle end.
Figure 4B:
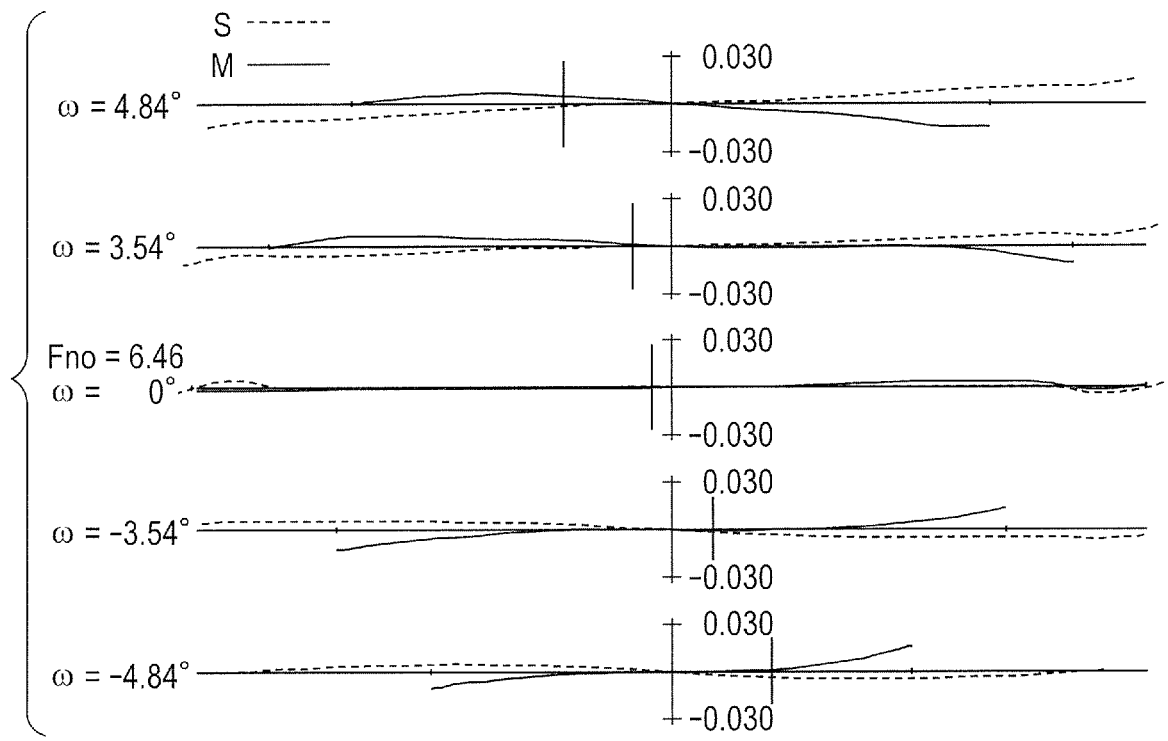
FIG. 4B is aberration diagrams of the zoom lens of Embodiment 1 with image stabilization for 0.3 degrees when focused at infinity at the telephoto end.

FIG. 1 is a lens cross-sectional view of Embodiment 1 of the present invention when focused at an object at infinity at the wide angle end. FIG. 2A and FIG. 2B are aberration diagrams of Embodiment 1 when focused at an object at infinity at the wide angle end and the telephoto end, respectively. FIG. 3A and FIG. 3B are lateral aberration diagrams of Embodiment 1 when focused at an object at infinity at the wide angle end and the telephoto end, respectively. FIG. 4A and FIG. 4B are lateral aberration diagrams of Embodiment 1 after image stabilization for 0.3 degrees when focused at an object at infinity at the wide angle end and the telephoto end, respectively. A zoom lens of Embodiment 1 has a zoom ratio of 9.41 and an F-number of from 3.40 to 6.46.

Figure 5:
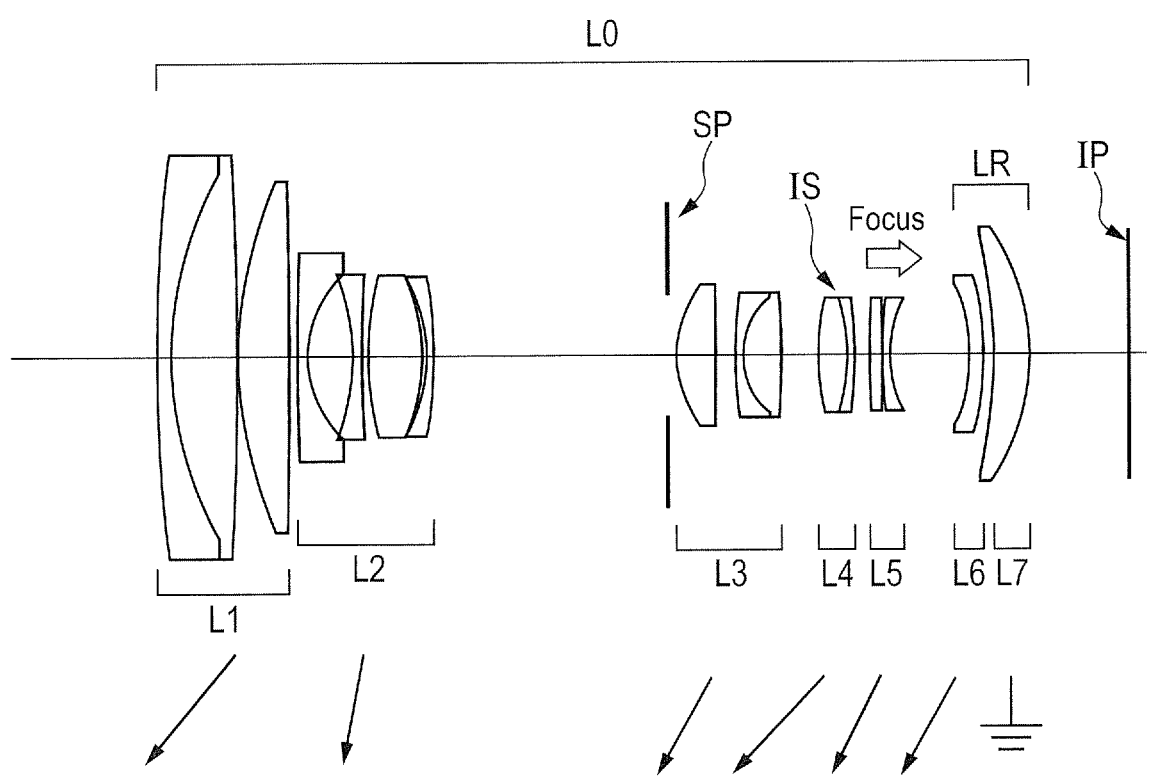
FIG. 5 is a lens cross-sectional view of a zoom lens according to Embodiment 2 of the present invention.
Figure 6A:
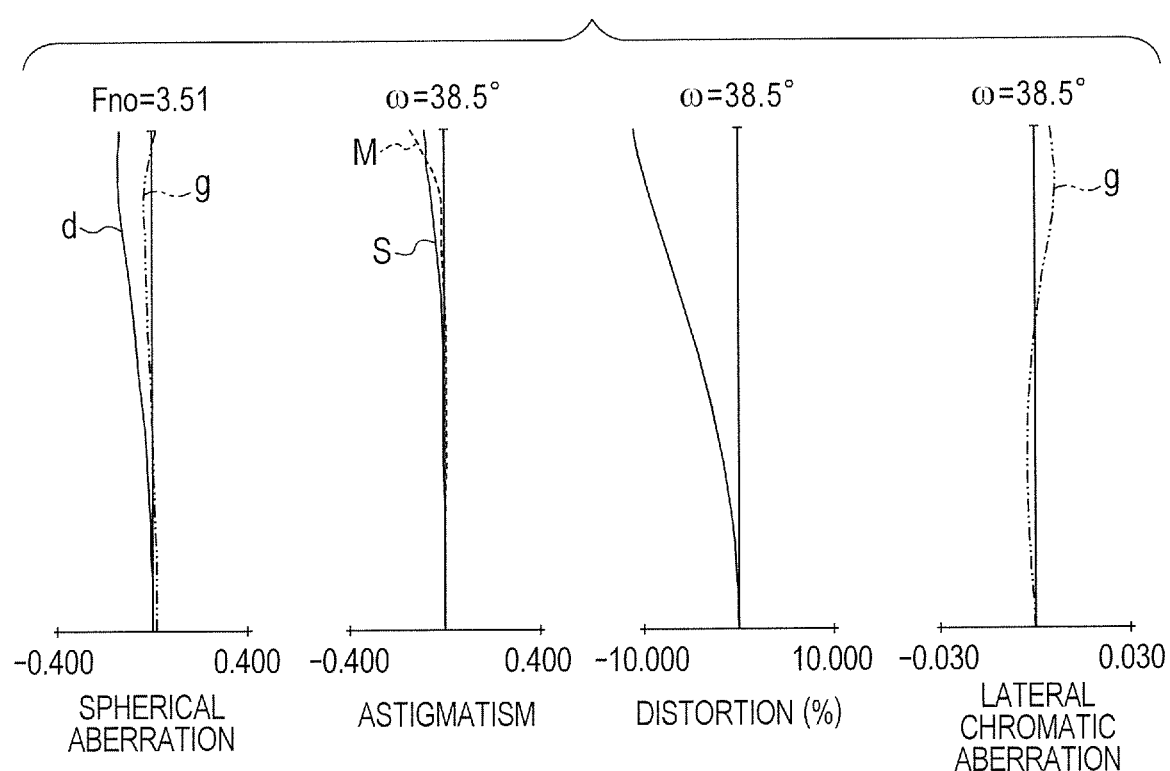
FIG. 6A is longitudinal aberration diagrams of the zoom lens of Embodiment 2 when focused at infinity at the wide angle end.
Figure 6B:
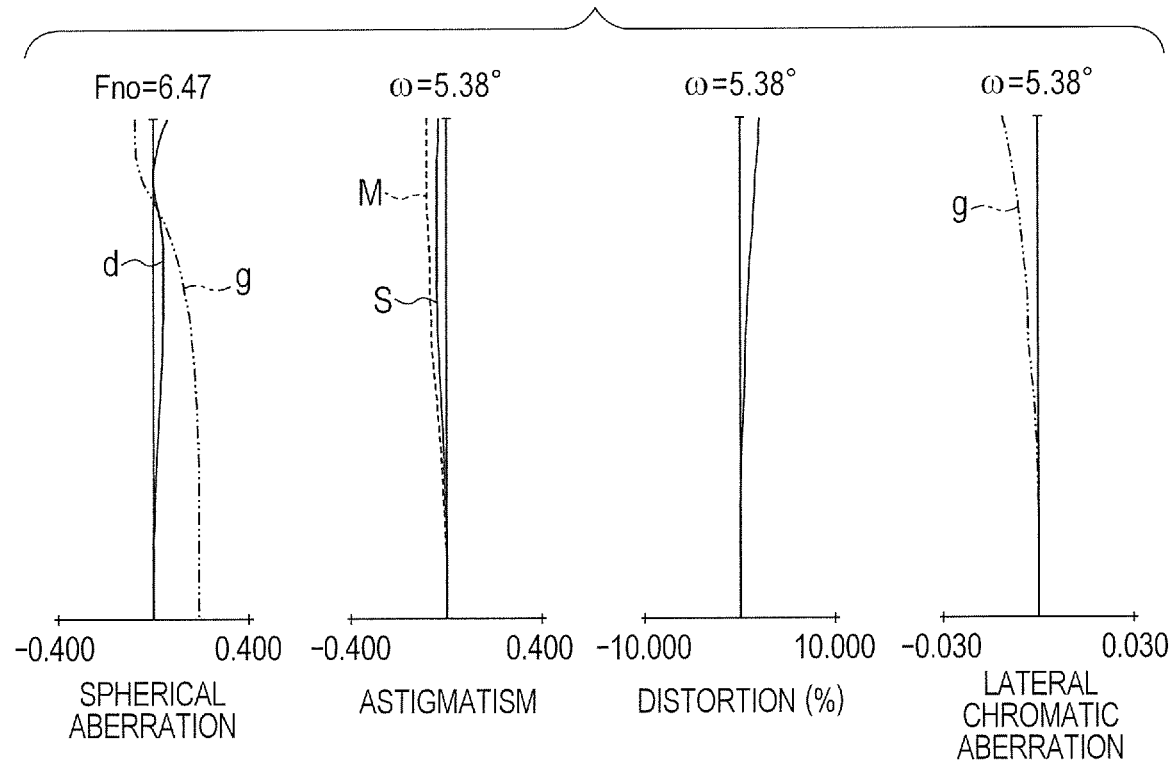
FIG. 6B is longitudinal aberration diagrams of the zoom lens of Embodiment 2 when focused at infinity at the telephoto end.
Figure 7A:
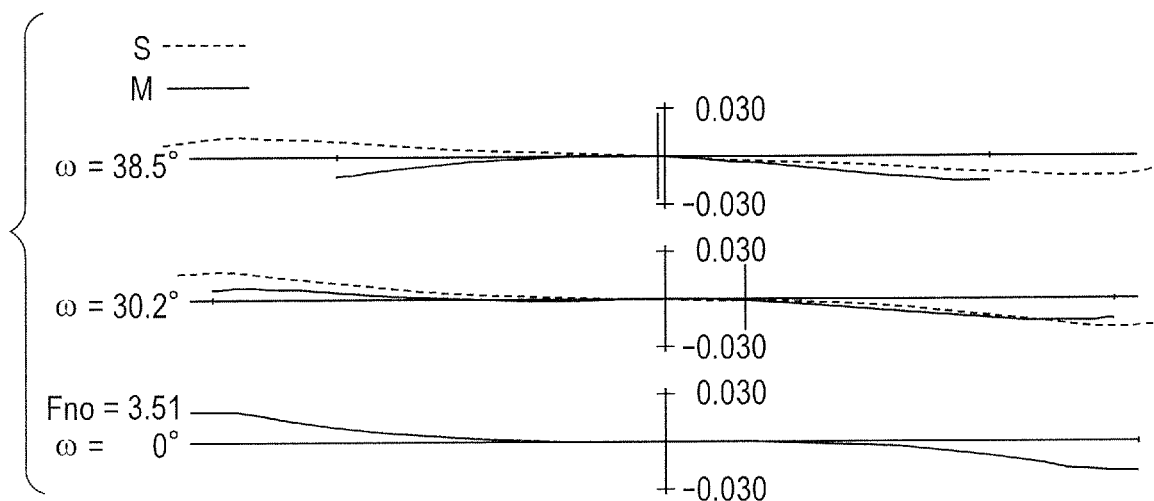
FIG. 7A is lateral aberration diagrams of the zoom lens of Embodiment 2 when focused at infinity at the wide angle end.
Figure 7B:
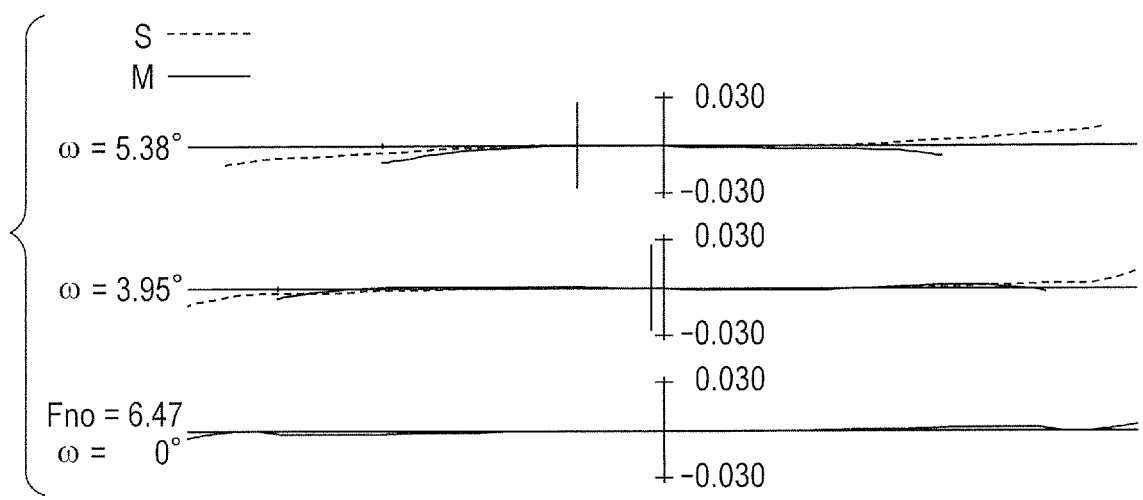
FIG. 7B is lateral aberration diagrams of the zoom lens of Embodiment 2 when focused at infinity at the telephoto end.
Figure 8A:
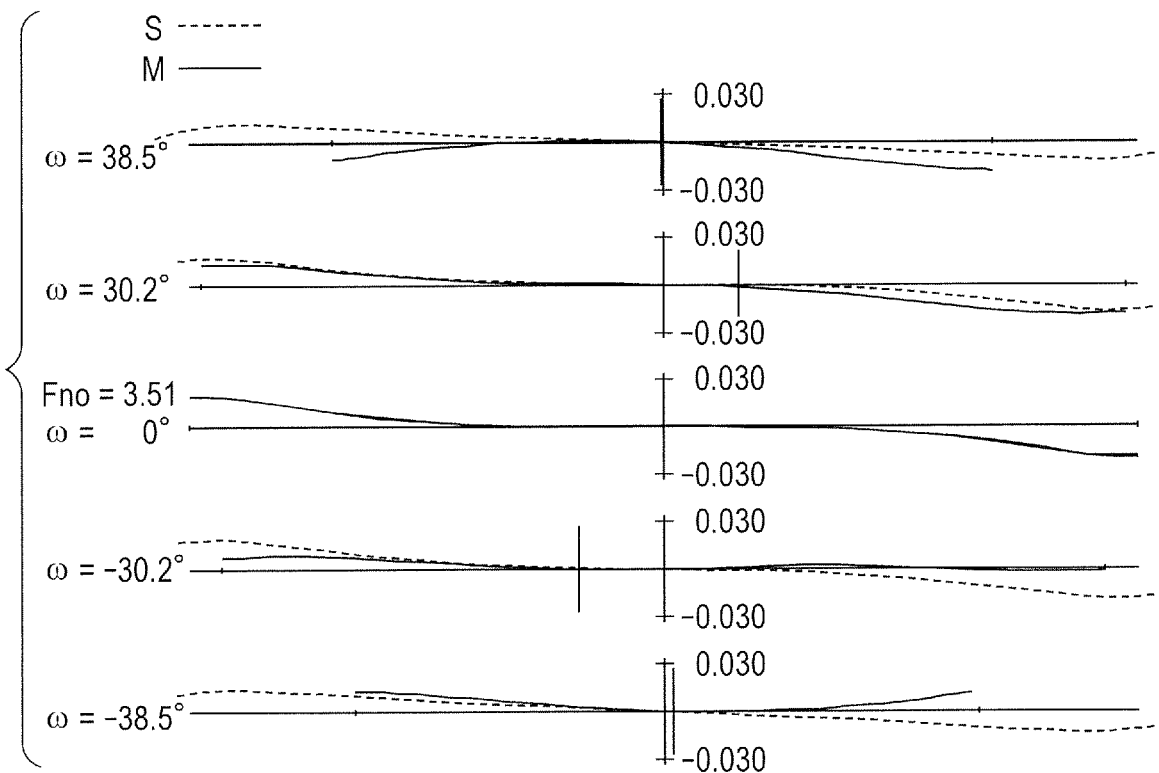
FIG. 8A is aberration diagrams of the zoom lens of Embodiment 2 with image stabilization for 0.3 degrees when focused at infinity at the wide angle end.
Figure 8B:
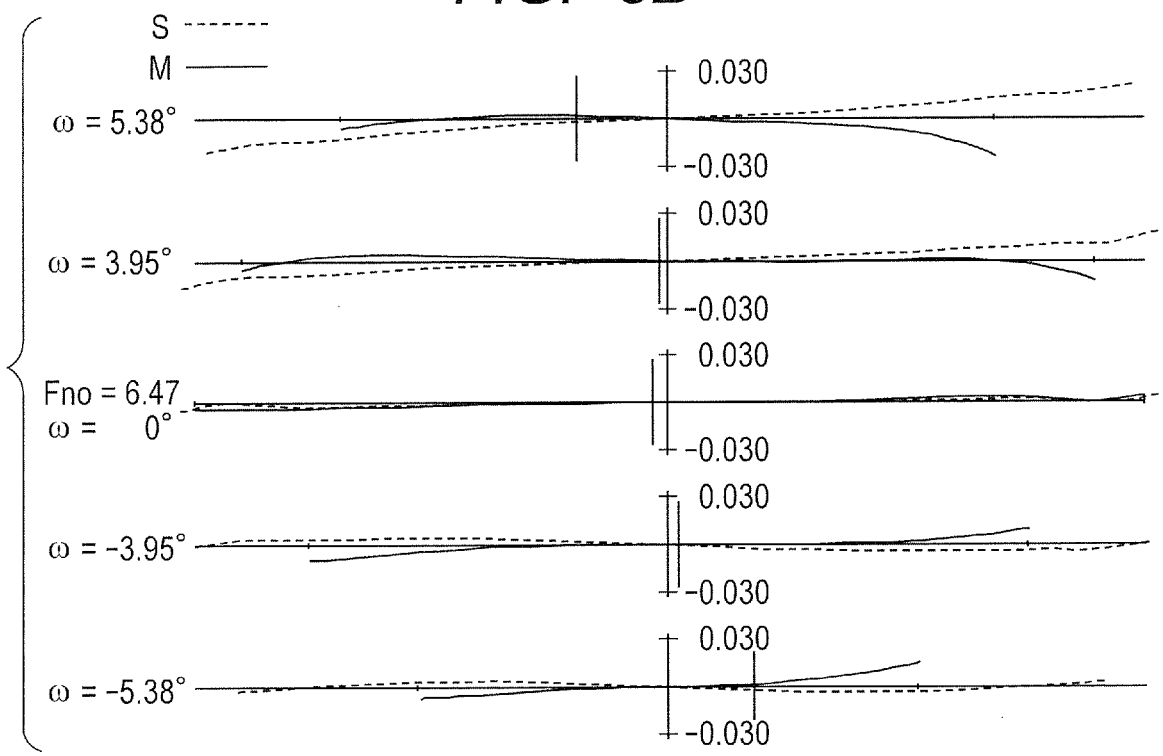
FIG. 8B is aberration diagrams of the zoom lens of Embodiment 2 with image stabilization for 0.3 degrees when focused at infinity at the telephoto end.

FIG. 5 is a lens cross-sectional view of Embodiment 2 of the present invention when focused at an object at infinity at the wide angle end. FIG. 6A and FIG. 6B are aberration diagrams of Embodiment 2 when focused at an object at infinity at the wide angle end and the telephoto end, respectively. FIG. 7A and FIG. 7B are lateral aberration diagrams of Embodiment 2 when focused at an object at infinity at the wide angle end and the telephoto end, respectively. FIG. 8A and FIG. 8B are lateral aberration diagrams of Embodiment 2 after image stabilization for 0.3 degrees when focused at an object at infinity at the wide angle end and the telephoto end, respectively. A zoom lens of Embodiment 2 has a zoom ratio of 8.46 and an F-number of from 3.51 to 6.47.

Figure 9:
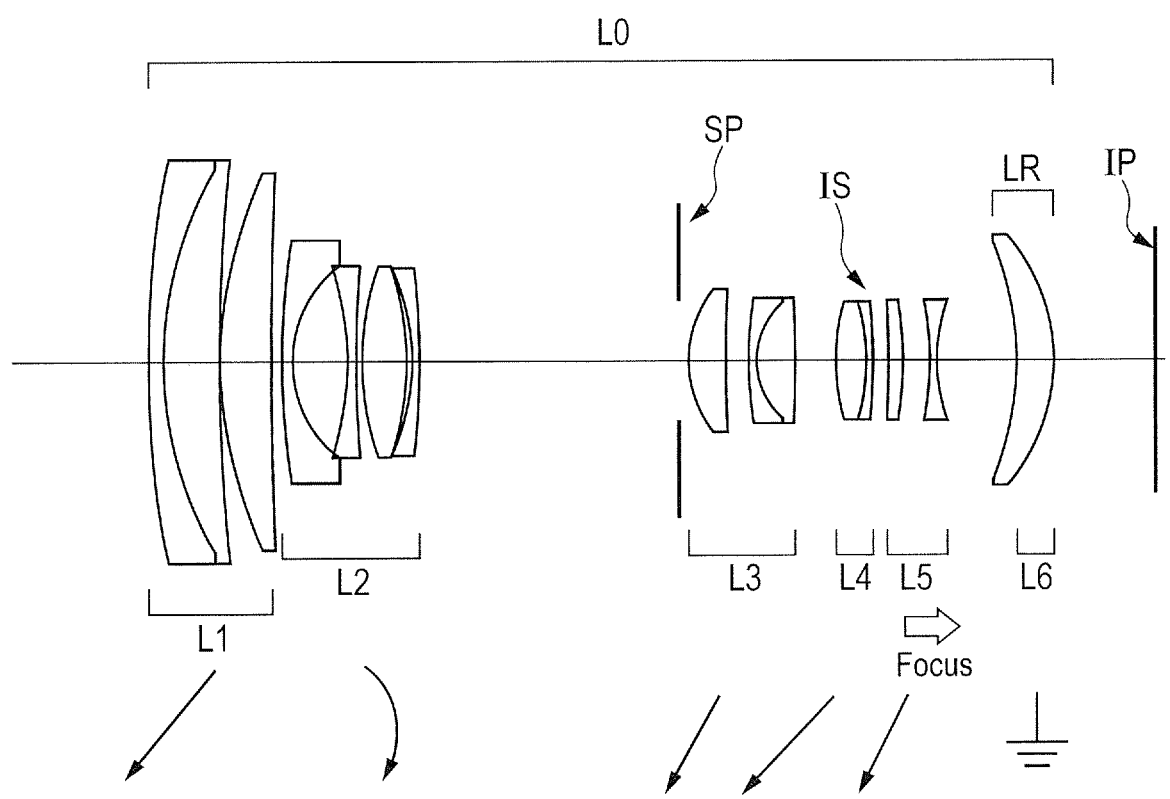
FIG. 9 is a lens cross-sectional view of a zoom lens according to Embodiment 3 of the present invention.
Figure 10A:
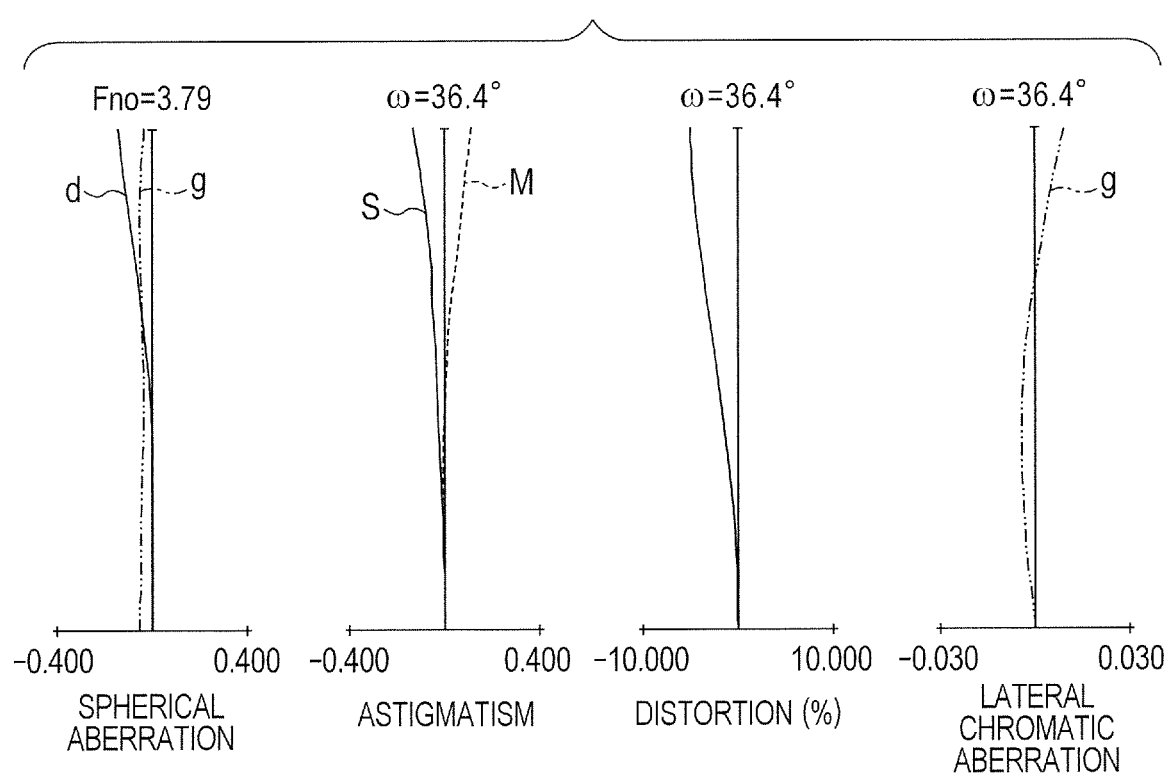
FIG. 10A is longitudinal aberration diagrams of the zoom lens of Embodiment 3 when focused at infinity at the wide angle end.
Figure 10B:
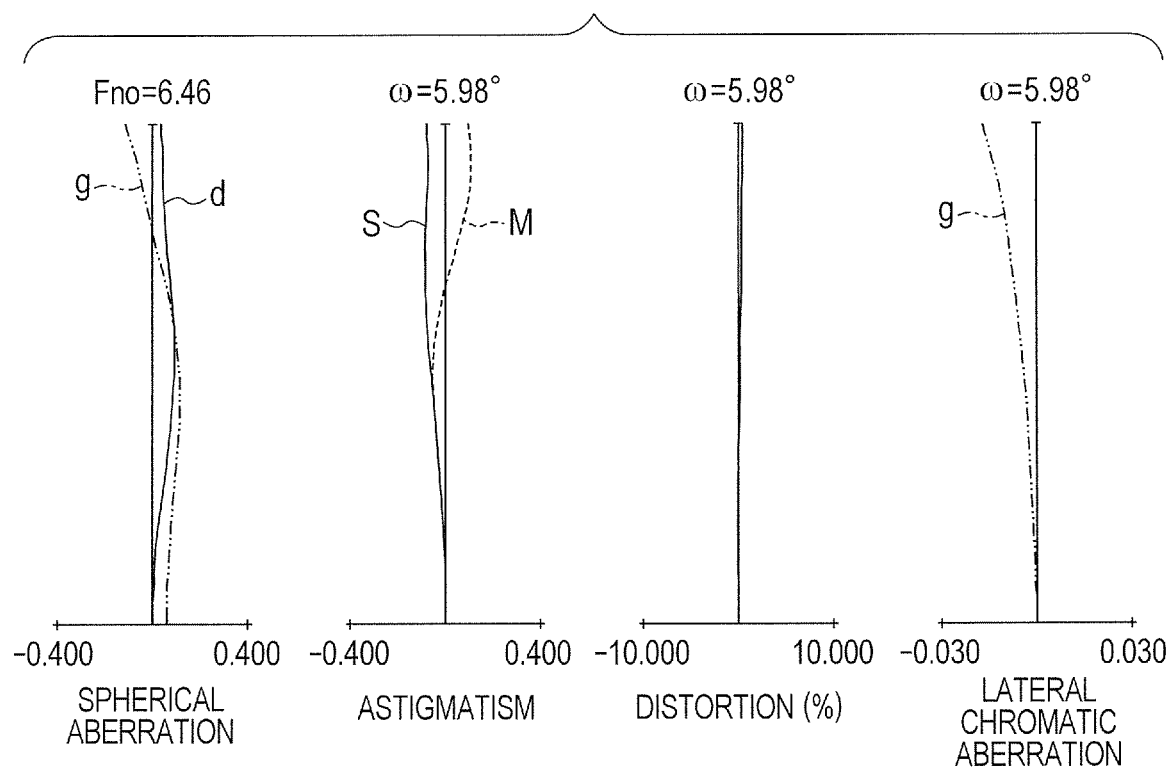
FIG. 10B is longitudinal aberration diagrams of the zoom lens of Embodiment 3 when focused at infinity at the telephoto end.
Figure 11A:
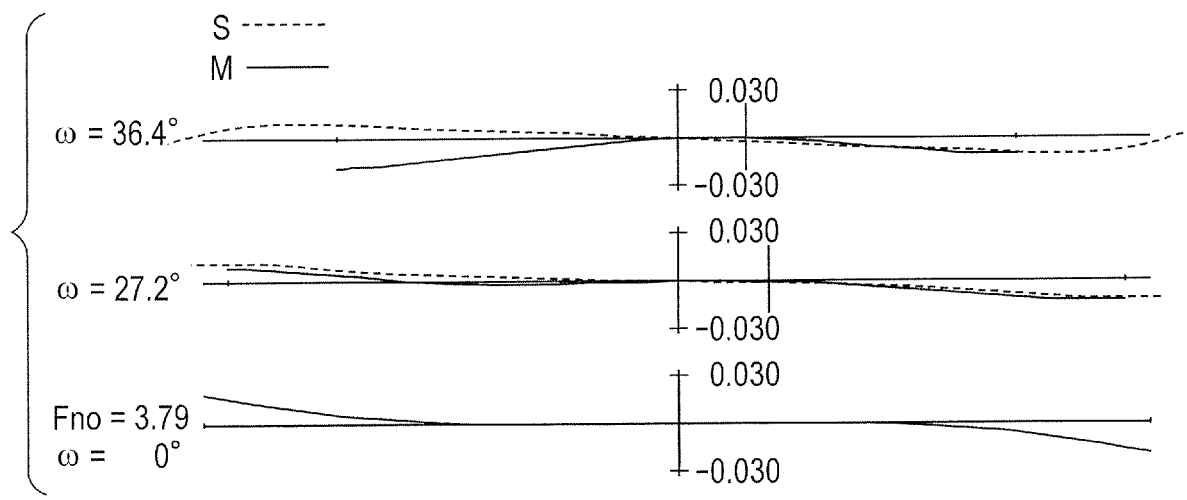
FIG. 11A is lateral aberration diagrams of the zoom lens of Embodiment 3 when focused at infinity at the wide angle end.
Figure 11B:
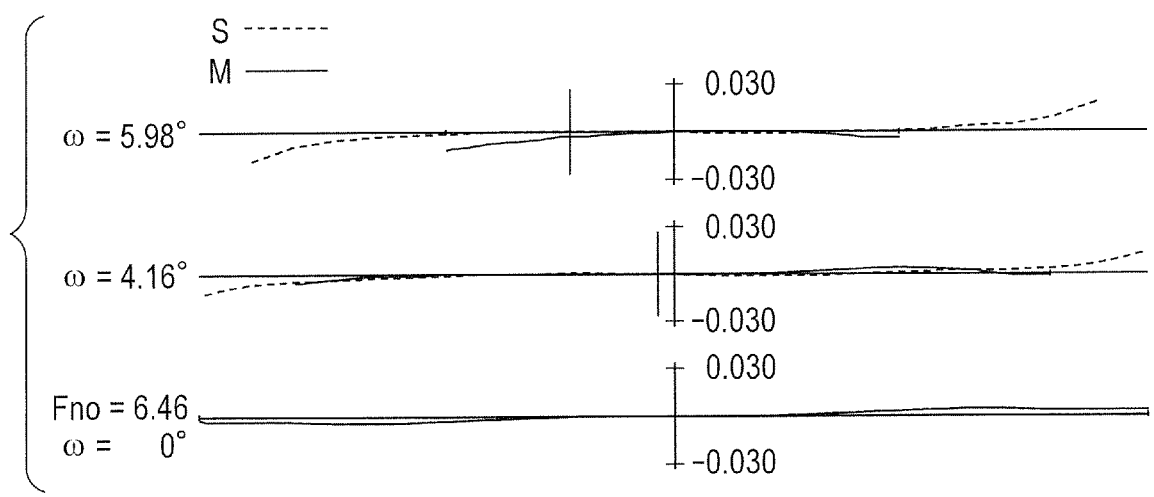
FIG. 11B is lateral aberration diagrams of the zoom lens of Embodiment 3 when focused at infinity at the telephoto end.
Figure 12A:
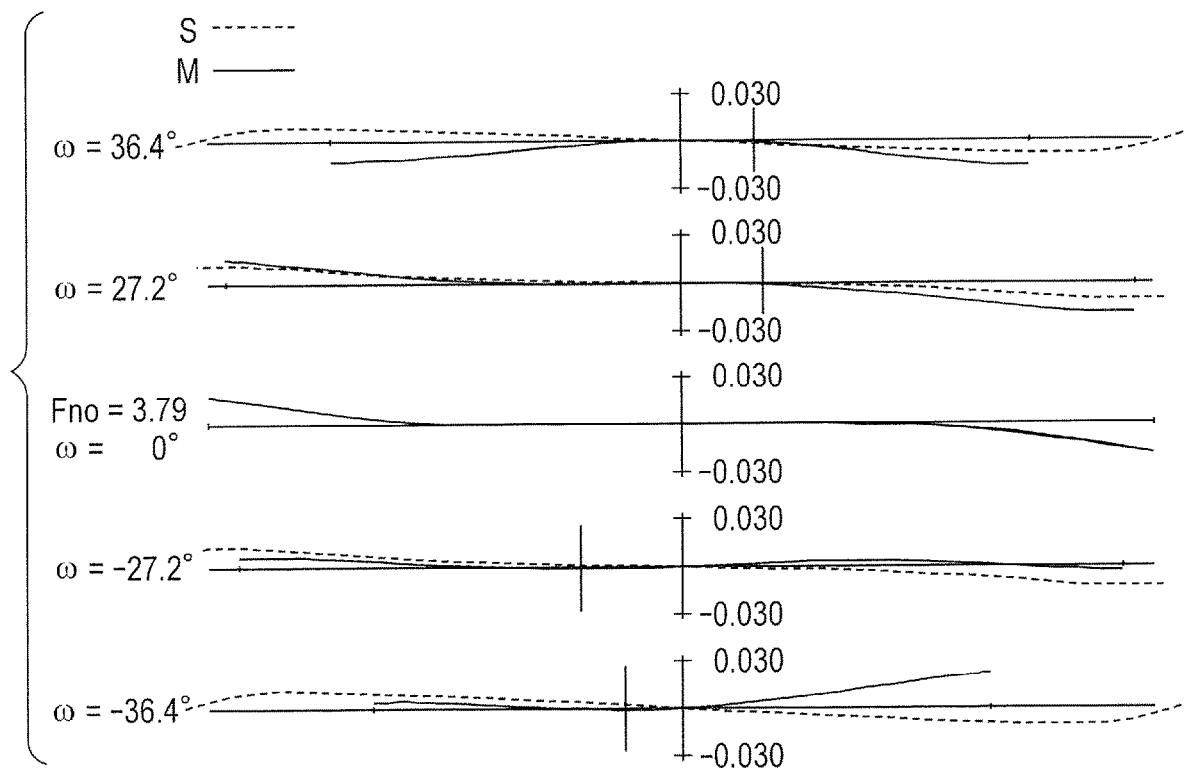
FIG. 12A is aberration diagrams of the zoom lens of Embodiment 3 with image stabilization for 0.3 degrees when focused at infinity at the wide angle end.
Figure 12B:
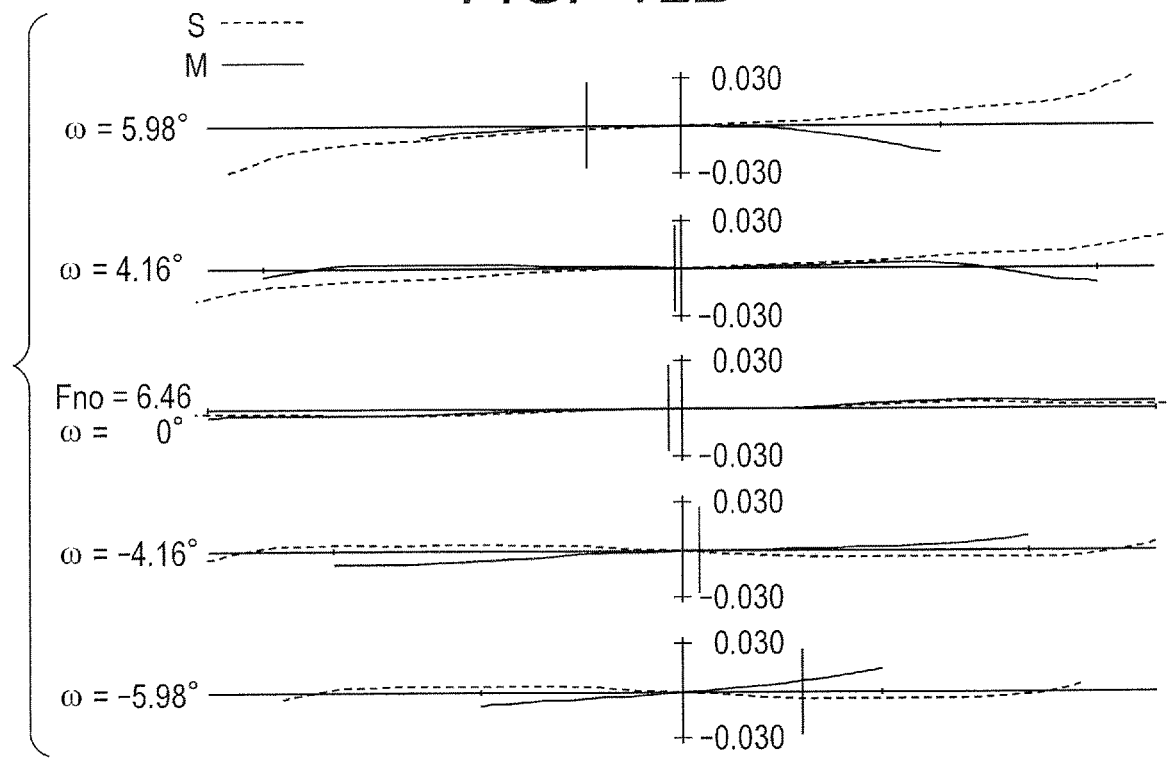
FIG. 12B is aberration diagrams of the zoom lens of Embodiment 3 with image stabilization for 0.3 degrees when focused at infinity at the telephoto end.

FIG. 9 is a lens cross-sectional view of Embodiment 3 of the present invention when focused at an object at infinity at the wide angle end. FIG. 10A and FIG. 10B are aberration diagrams of Embodiment 3 when focused at an object at infinity at the wide angle end and the telephoto end, respectively. FIG. 11A and FIG. 11B are lateral aberration diagrams of Embodiment 3 when focused at an object at infinity at the wide angle end and the telephoto end, respectively. FIG. 12A and FIG. 12B are lateral aberration diagrams of Embodiment 3 after image stabilization for 0.3 degrees when focused at an object at infinity at the wide angle end and the telephoto end, respectively. A zoom lens of Embodiment 3 has a zoom ratio of 7.05 and an F-number of from 3.79 to 6.46.

Figure 13:
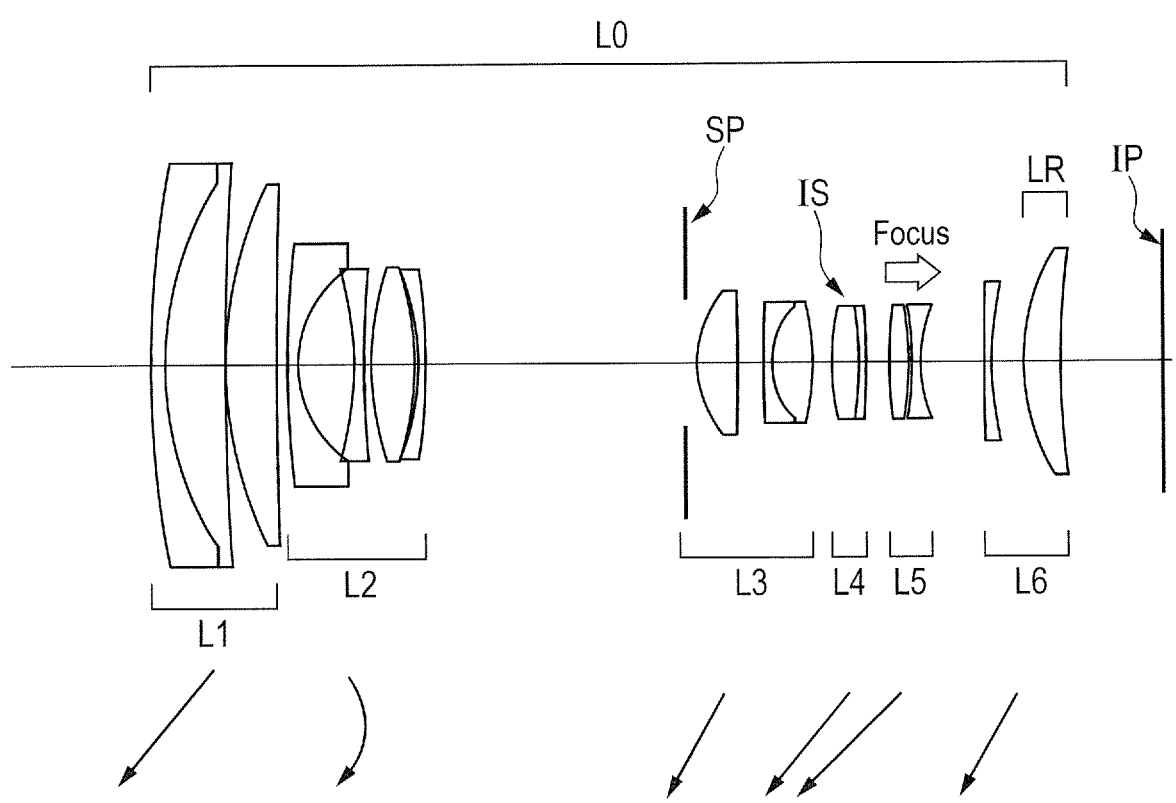
FIG. 13 is a lens cross-sectional view of a zoom lens according to Embodiment 4 of the present invention.
Figure 14A:
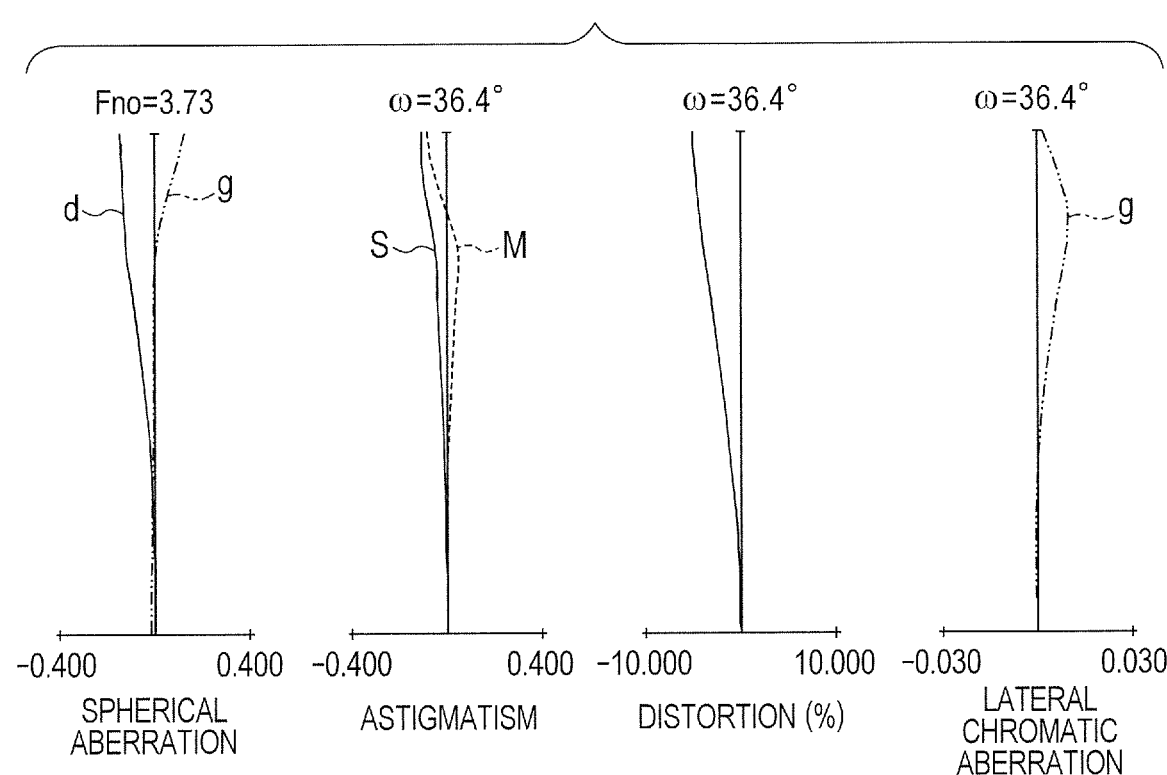
FIG. 14A is longitudinal aberration diagrams of the zoom lens of Embodiment 4 when focused at infinity at the wide angle end.
Figure 14B:
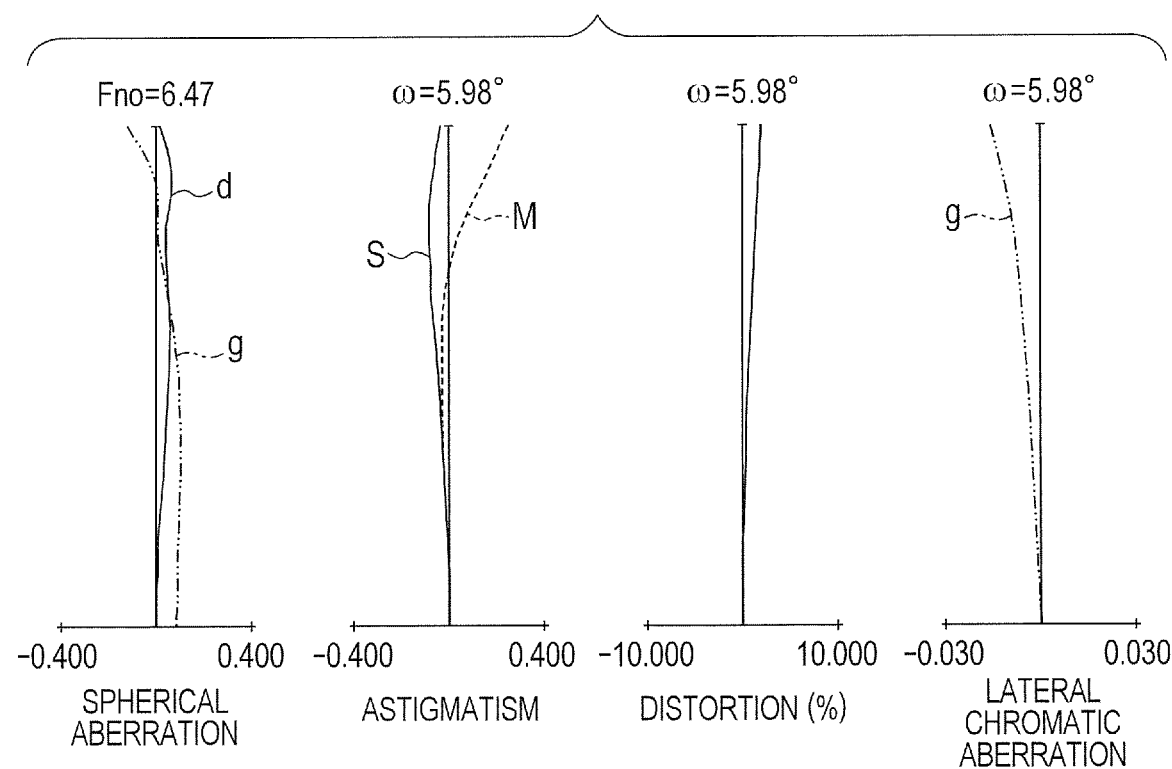
FIG. 14B is longitudinal aberration diagrams of the zoom lens of Embodiment 4 when focused at infinity at the telephoto end.
Figure 15A:
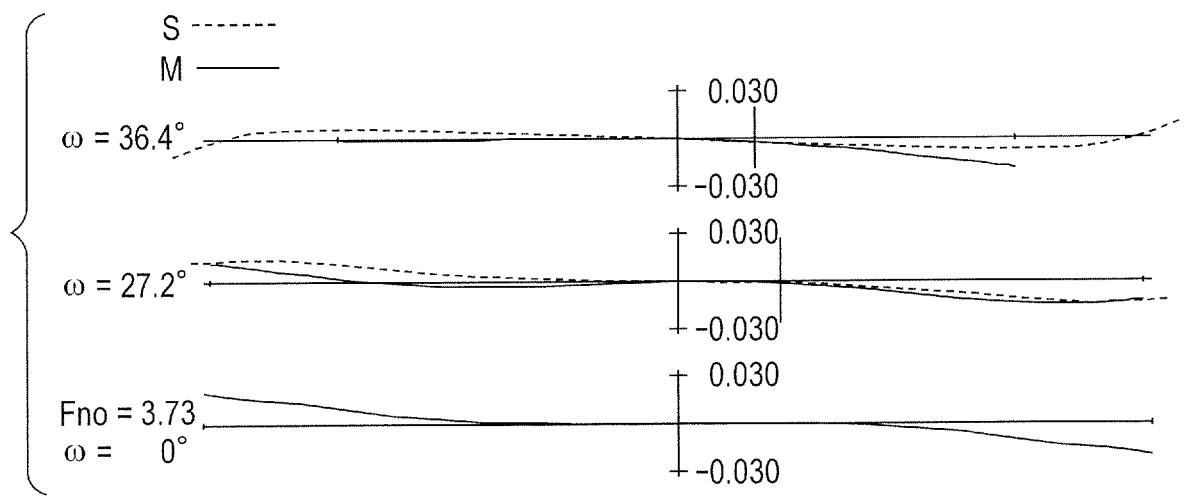
FIG. 15A is lateral aberration diagrams of the zoom lens of Embodiment 4 when focused at infinity at the wide angle end.
Figure 15B:
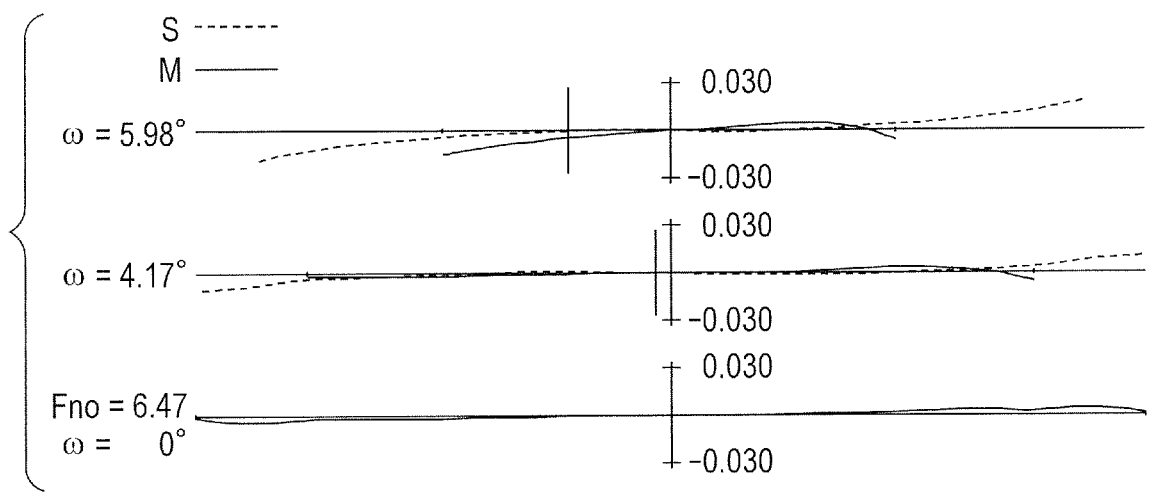
FIG. 15B is lateral aberration diagrams of the zoom lens of Embodiment 4 when focused at infinity at the telephoto end.
Figure 16A:
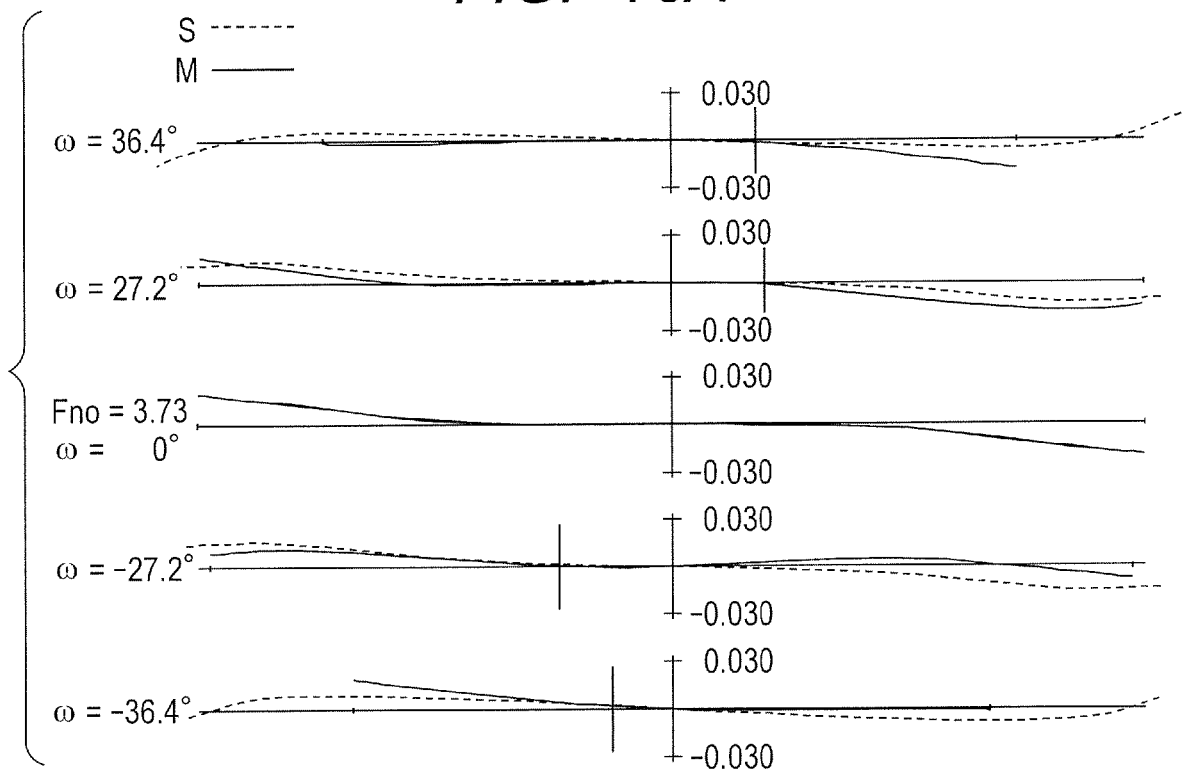
FIG. 16A is aberration diagrams of the zoom lens of Embodiment 4 with image stabilization for 0.3 degrees when focused at infinity at the wide angle end.
Figure 16B:
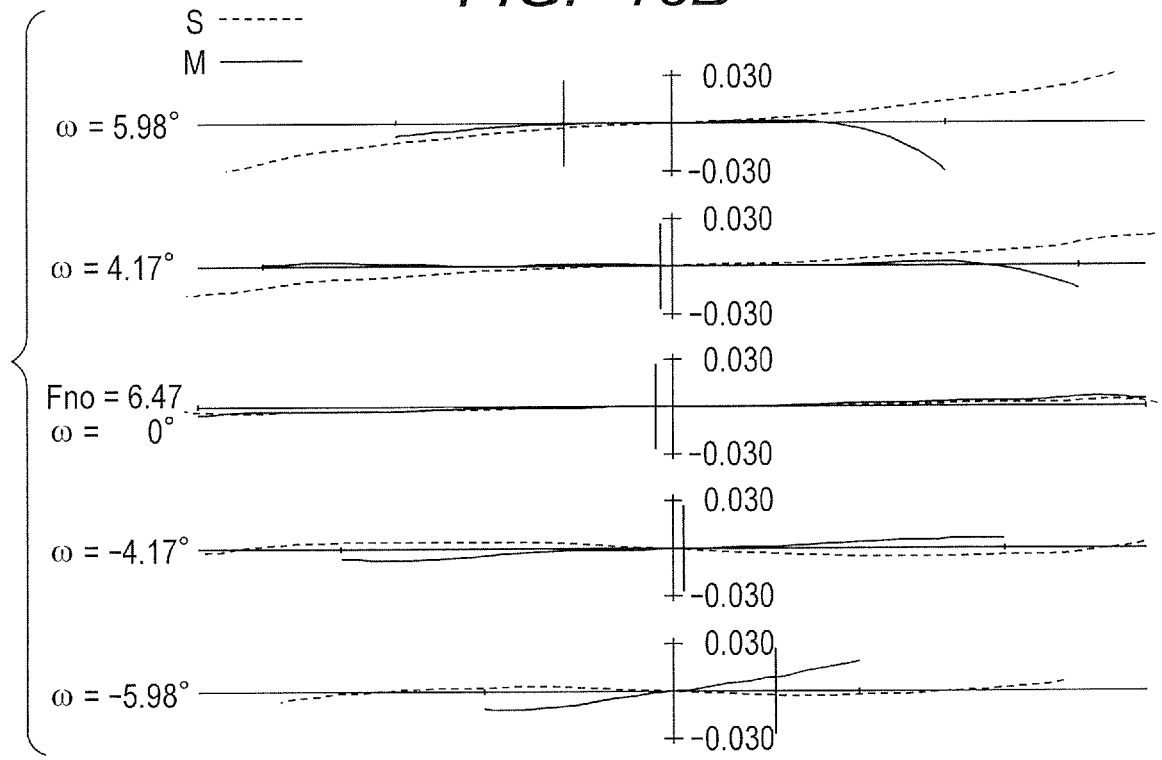
FIG. 16B is aberration diagrams of the zoom lens of Embodiment 4 with image stabilization for 0.3 degrees when focused at infinity at the telephoto end.

FIG. 13 is a lens cross-sectional view of Embodiment 4 of the present invention when focused at an object at infinity at the wide angle end. FIG. 14A and FIG. 14B are aberration diagrams of Embodiment 4 when focused at an object at infinity at the wide angle end and the telephoto end, respectively. FIG. 15A and FIG. 15B are lateral aberration diagrams of Embodiment 4 when focused at an object at infinity at the wide angle end and the telephoto end, respectively. FIG. 16A and FIG. 16B are lateral aberration diagrams of Embodiment 4 after image stabilization for 0.3 degrees when focused at an object at infinity at the wide angle end and the telephoto end, respectively. A zoom lens of Embodiment 4 has a zoom ratio of 7.05 and an F-number of from 3.73 to 6.47.

Figure 17:
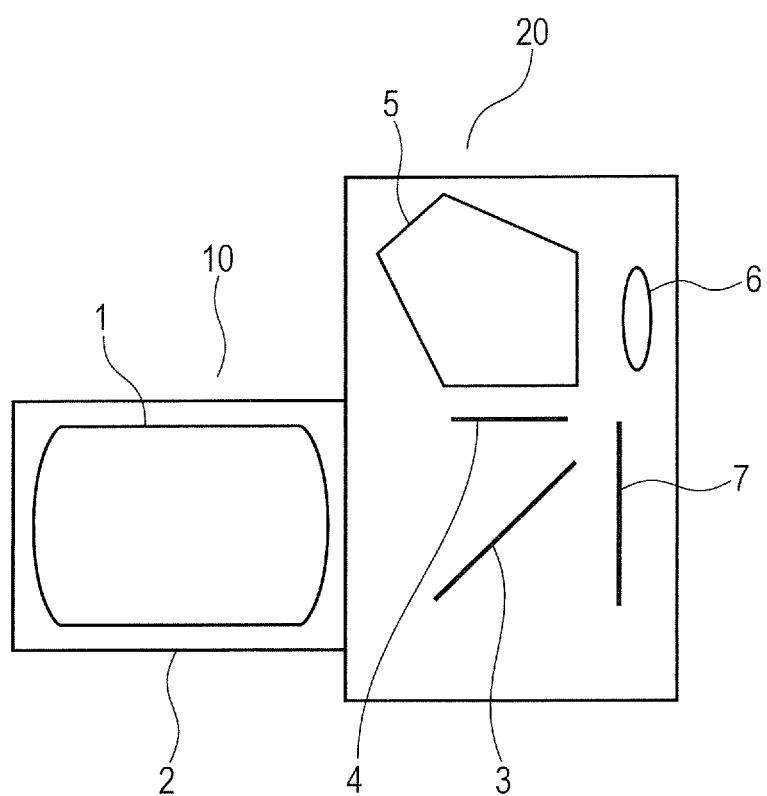
FIG. 17 is a schematic diagram of a main part of a digital single-lens reflex camera (image pickup apparatus) having the zoom lens of the present invention mounted thereon.

FIG. 17 is a schematic diagram of a main part of a digital single-lens reflex camera (image pickup apparatus) having the zoom lens of the present invention mounted thereon.

The zoom lens of the present invention is used as an image pickup optical system of image pickup apparatus such as a digital camera, a video camera, a broadcasting camera, a monitoring camera, and a silver-halide film camera. The zoom lens of the present invention may also be used as a projection optical system for a projection apparatus (projector).

In the lens cross-sectional views, the left side is the object side (front), and the right side is the image side (rear). A zoom lens L0 is illustrated in each of the lens cross-sectional views. When the order of a lens unit from the object side is represented by i, the i-th lens unit is represented by Li. A rear lens group LR includes one or more lens units. An image stabilization unit IS is configured to move in the direction having the vertical component with respect to the optical axis during image stabilization.

An aperture stop SP is also illustrated. An image plane IP corresponds to an image pickup surface of an image pickup element (photo-electric conversion element) such as a CCD sensor or a CMOS sensor when the zoom lens is used as an image pickup apparatus for a digital camera, a video camera, or the like. When the zoom lens is used as an image pickup apparatus of a silver-halide film camera, the image plane IP corresponds to a film surface. During zooming from the wide angle end to the telephoto end, each lens unit is configured to move as indicated by the arrows. The arrow related to "Focus" indicates a movement direction of a focusing lens unit during focusing from infinity to close proximity.

In the spherical aberration diagram, an F-number is represented by Fno. Further, d indicates d-line (wavelength: 587.6 nm), and g indicates g-line (wavelength: 435.8 nm). In the astigmatism diagram, M indicates a meridional image plane at the d-line and S indicates a sagittal image plane at the d-line. The distortion diagram is an illustration about the d-line. The lateral chromatic aberration diagram is an illustration about the g-line. A half angle of view (degree) is represented by $\omega$.

The zoom lens of the present invention includes the following lens units, which are arranged in order from the object side to the image side: a first lens unit L1 having a positive refractive power, a second lens unit L2 having a negative refractive power, a third lens unit L3 having a positive refractive power, a fourth lens unit L4 having a positive refractive power, a fifth lens unit L5 having a negative refractive power, and a rear lens group LR including one or more lens units. The third lens unit L3 is configured to move toward the object side during zooming from the wide angle end to the telephoto end.

An interval between each pair of adjacent lens units is changed during zooming. The fourth lens unit L4 is configured to move in the direction having the vertical component with respect to the optical axis during image stabilization. The fifth lens unit L5 (focusing lens unit) is configured to move toward the image side during focusing from infinity to close proximity.

In the present invention, an image blur is corrected by the fourth lens unit having a positive refractive power. With this configuration, a magnification can be effectively varied by the fifth lens unit having a negative refractive power, and it is easy to increase the zoom ratio while decreasing the entire system in size. Here, a focal length of the third lens unit L3 is represented by f3, and a focal length of the fourth lens unit L4 is represented by f4. In this case, the following conditional expression is satisfied.

$$1.2 < f4/f3 < 3.0 \tag{1.0}$$

Next, the technical meaning of the above-mentioned conditional expression is described. Conditional Expression (1) is intended to effectively correct an image blur by the fourth lens unit L4, and appropriately adjust refractive power distribution between the positive refractive power of the third lens unit L3 and the positive refractive power of the fourth lens unit L4, thereby reducing deterioration of optical performance due to a manufacturing tolerance of a lens unit having a positive refractive power.

When the value exceeds the upper limit value of Conditional Expression (1), the refractive power of the fourth lens unit L4 is too weak, and hence the decrease in optical performance due to the manufacturing tolerance of the third lens unit L3 increases. Further, the image stabilization sensitivity of the fourth lens unit L4 decreases, and hence the entire system increases in size in a radial direction thereof, which is not preferred. When the value falls below the lower limit value of Conditional Expression (1), the positive refractive power of the fourth lens unit L4 is too strong, with the result that the image stabilization sensitivity of the fourth lens unit L4 increases, and decrease in optical performance during image stabilization increases. It is more preferred to set the numerical range of Conditional Expression (1) as follows.

$$1.25 < f4/f3 < 1.8 \tag{1A}$$

Next, more preferred conditions for carrying out the present invention are described. The fourth lens unit L4 may include three or less lenses. As the weight of the fourth lens unit L4 for image stabilization increases, a mechanism for driving the lens unit increases in size, leading to increase in entire system in size. Thus, the fourth lens unit L4 for image stabilization is preferably light.

However, it is difficult to correct aberration during image stabilization by a single lens, and hence it is preferred that the fourth lens unit L4 include three or less lenses. The fourth lens unit L4 preferably includes three or less lenses including a positive lens and a negative lens. The fourth lens unit L4 more preferably is constituted by a positive lens and a negative lens.

It is preferred that an interval between the third lens unit L3 and the fourth lens unit L4 be narrower at the telephoto end than at the wide angle end. The third lens unit L3 having a positive refractive power and the fourth lens unit L4 having a positive refractive power are configured to move toward the object side to effectively move a principal point position of the entire system toward the object side during zooming from the wide angle end to the telephoto end. Here, the fourth lens unit L4 having a refractive power that is weaker than the refractive power of the third lens unit L3 is configured to move during zooming more than the third lens unit L3. That is, the fourth lens unit L4 is configured to move to narrow the interval between the third lens unit L3 and the fourth lens unit L4 so that a high zoom ratio may be effectively obtained while variation in spherical aberration during zooming is reduced.

In each Embodiment, it is preferred to satisfy one or more conditional expressions provided below. A curvature radius of a lens surface of the fourth lens unit L4 that is closest to the object side is represented by R4a, and a curvature radius of a lens surface of the fourth lens unit L4 that is closest to the image side is represented by R4b. A focal length of the fifth lens unit L5 is represented by f5. A focal length of the entire system at the wide angle end is represented by fw. A focal length of the rear lens group LR at the wide angle end is represented by frw. A focal length of the first lens unit L1 is represented by f1. A focal length of the second lens unit L2 is represented by f2.

In this case, it is preferred to satisfy one or more of the following conditional expressions.

$$0.5<|R4a|/f4<1.5 \quad (2)$$

$$1.0<|R4b|/f4<5.0 \quad (3)$$

$$10<-f5/fw<2.5 \quad (4)$$

$$-0.3<fw/frw<0.5 \quad (5)$$

$$3.5<f1/fw<6.0 \quad (6)$$

$$0.7<-f2/fw<1.2 \quad (7)$$

$$1.0<f3/fw<2.0 \quad (8)$$

$$1.5<f4/fw<3.5 \quad (9)$$

Next, technical meanings of the respective conditional expressions are described. Conditional Expressions (2) and (3) are intended to satisfactorily correct an image blur by the fourth lens unit L4. When the curvature radii of the lens surfaces are large to some extent, an incident angle of a light beam entering the lens unit hardly changes during image stabilization, which is preferred. When the values fall below the lower limit values of Conditional Expressions (2) and (3), the curvature radii of the lens surfaces are too small, with the result that an incident angle of a light beam entering the fourth lens unit L4 greatly changes during image stabilization, and the optical performance decreases during image stabilization, which is not preferred. When the values exceed the upper limit values of Conditional Expressions (2) and (3), the curvature radii of the lens surfaces are too large, with the result that an incident angle of a light beam entering the correction lens per a movement of the correction lens is small during image stabilization, and large amount of movement of the correction lens is required to obtain a certain effect of the image stabilization, which is not preferred.

It is more preferred to set the numerical ranges of Conditional Expressions (2) and (3) as follows.

$$0.6<|R4a|/f4<1.1 \quad (2A)$$

$$1.3<|R4b|/f4<3.5 \quad (3A)$$

Conditional Expression (4) is intended to appropriately set the refractive power of the fifth lens unit L5 having a negative refractive power, thereby obtaining satisfactory optical performance over the entire zoom range while increasing the zoom ratio. When the value exceeds the upper limit value of Conditional Expression (4), the negative refractive power of the fifth lens unit L5 is too weak (the absolute value of the negative refractive power is too small), with the result that a magnification effect of the fifth lens unit L5 decreases, and it is difficult to increase the zoom ratio. When the value falls below the lower limit value of Conditional Expression (4), the negative refractive power of the fifth lens unit L5 is too strong (the absolute value of the negative refractive power is too large), with the result that, although such a value is effective in increasing the zoom ratio, variation in spherical aberration over the entire zoom range increases, which is not preferred.

It is more preferred to set the numerical ranges of Conditional Expression (4) as follows.

$$1.05<-f5/fw<2.00 \quad (4A)$$

When the value falls below the lower limit value of Conditional Expression (5), the negative refractive power of the rear lens group LR is too strong, and an incident angle of a light flux entering the image plane is large. As a result, light flux vignetting occurs in a pixel of an image pickup element, which is called shading, to deteriorate the color and illuminance of peripheral images, which is not preferred. When the value exceeds the upper limit value of Conditional Expression (5), the positive refractive power of the rear lens group LR is too strong, with the result that an exit pupil position is far away from the image plane, and the total lens length at the wide angle end increases, which is not preferred.

Conditional Expression (5) more preferably satisfies Conditional Expression (5A).

$$-0.15<fw/frw<0.25 \quad (5A)$$

Conditional Expressions (6), (7), (8), and (9) are intended to optimize the refractive power of each of the first lens unit L1, the second lens unit L2, the third lens unit L3, and the fourth lens unit L4, thereby decreasing the entire system in size while suppressing aberration variation during zooming. When the value exceeds the upper limit value of Conditional Expression (6), the positive refractive power of the first lens unit L1 is too weak, and hence it is difficult to increase the zoom ratio. When the value falls below the lower limit value of Conditional Expression (6), the positive refractive power of the first lens unit L1 is too strong, and hence variation in spherical aberration during zooming increases, which is not preferred.

When the value exceeds the upper limit value of Conditional Expression (7), the negative refractive power of the second lens unit L2 is too weak, and hence it is difficult to increase the zoom ratio. When the value falls below the lower limit value of Conditional Expression (7), the negative refractive power of the second lens unit L2 is too strong, with the result that distortion increases at the wide angle end, and variation in astigmatism during zooming increases, which is not preferred.

When the value exceeds the upper limit value of Conditional Expression (8), the positive refractive power of the third lens unit L3 is too weak, and hence it is difficult to increase the zoom ratio. When the value falls below the lower limit value of Conditional Expression (8), the positive refractive power of the third lens unit L3 is too strong and variation in spherical aberration during zooming increases, which is not preferred.

When the value exceeds the upper limit value of Conditional Expression (9), the positive refractive power of the fourth lens unit L4 is too weak, and hence the zoom ratio is hard to sufficiently obtain by movement of the fourth lens unit L4 during zooming, which is not preferred. Further, a movement amount of the fourth lens unit L4 during image stabilization increases to increase the entire system in size, which is not preferred. When the value falls below the lower limit value of Conditional Expression (9), the positive refractive power of the fourth lens unit L4 is too strong, and hence it is difficult to maintain satisfactory optical performance during image stabilization, which is not preferred.

It is more preferred to set the numerical ranges of Conditional Expressions (6) to (9) as follows.

$$4.0 < f1/fw < 5.5 \quad (6A)$$

$$0.8 < -f2/fw < 1.0 \quad (7A)$$

$$1.3 < f3/fw < 1.8 \quad (8A)$$

$$1.8 < f4/fw < 2.8 \quad (9A)$$

A preferred focusing method may be the one that moves the fifth lens unit L5 toward the image side during focusing from infinity to close proximity. It is demanded for digital cameras in recent years to be capable of photographing moving images, and thus image magnification changes due to focusing are demanded to be small. To fulfill this demand, it is preferred that a lens unit for focusing be arranged at a position close to an image plane, and the fifth lens unit L5 is suitable for the lens unit for focusing in each Embodiment.

It is preferred that the fifth lens unit L5 is constituted by two lenses. In order to reduce aberration variation due to zooming and aberration variation due to focusing, and the thickness of the lens unit, thereby efficiently varying the magnification, it is preferred that the fifth lens unit L5 include one positive lens and one negative lens.

Next, a lens configuration in each of Embodiments is described. The zoom lens according to Embodiment 1 includes the following lens units, which are arranged in order from the object side to the image side: a first lens unit L1 having a positive refractive power, a second lens unit L2 having a negative refractive power, a third lens unit L3 having a positive refractive power, a fourth lens unit L4 having a positive refractive power, a fifth lens unit L5 having a negative refractive power, a sixth lens unit L6 having a negative refractive power, and a seventh lens unit L7 having a positive refractive power. Embodiment 1 relates to a seven-unit zoom lens.

The rear lens group LR includes the sixth lens unit L6 having a negative refractive power and the seventh lens unit L7 having a positive refractive power. The first lens unit L1, the second lens unit L2, the third lens unit L3, the fourth lens unit L4, the fifth lens unit L5, and the sixth lens unit L6 are configured to move toward the object side during zooming from the wide angle end to the telephoto end. The seventh lens unit L7 is configured not to move during zooming. Further, the fourth lens unit L4 is configured to move, as a whole, in the direction having the vertical component with respect to the optical axis, thereby correcting an image blur.

The third lens unit L3 having a positive refractive power is configured to move toward the object side to move the principal point of the entire system toward the object side during zooming from the wide angle end to the telephoto end. Thus, the zoom ratio easily increases. A ratio between the refractive power of the third lens unit L3 and the refractive power of the fourth lens unit L4 satisfies Conditional Expression (1). With this, the image stabilization sensitivity is appropriately set while the positive refractive powers are effectively distributed, and decrease in optical performance due to the manufacturing tolerance is thus reduced. Further, the fourth lens unit L4 having a relatively weak positive refractive power is configured to move toward the object side by a larger amount than the third lens unit L3.

That is, the fourth lens unit L4 is configured to move to narrow the interval between the third lens unit L3 and the fourth lens unit L4 so that variation in spherical aberration may be reduced while the zoom ratio increases. Further, the fourth lens unit L4 includes a positive lens and a negative lens, and the lens surface of the fourth lens unit L4 that is closest to the object side and the lens surface thereof that is closest to the image side satisfy Conditional Expressions (2) and (3). With this, the zoom lens including an image stabilization drive mechanism is easily decreased in size and weight while the optical performance during image stabilization is satisfactorily maintained.

Further, the refractive power of the fifth lens unit L5 satisfies Conditional Expression (4) to effectively increase the zoom ratio. Further, the fifth lens unit L5 includes the two lenses. The fifth lens unit L5 is configured to move toward the image side during focusing from infinity to close proximity. With this, the lens unit for focusing decreases in weight, and a quiet drive is facilitated. Then, variation in image magnification during focusing is reduced so that the zoom lens may also be suitable for moving image photography.

Further, the rear lens group LR, which includes the sixth lens unit L6 and the seventh lens unit L7, has a combined focal length at the wide angle end that satisfies Conditional Expression (5). With this, the entire system is decreased in size while an incident angle of a light flux entering the image plane is restricted.

The refractive power of the first lens unit L1 satisfies Conditional Expression (6). With this, the entire system is decreased in size while variation in spherical aberration and variation in lateral chromatic aberration during zooming are suppressed.

The refractive power of the second lens unit L2 satisfies Conditional Expression (7). With this, the entire system is decreased in size while variation in spherical aberration, variation in lateral chromatic aberration, and variation in curvature of field during zooming are suppressed.

The refractive power of the third lens unit L3 satisfies Conditional Expression (8). With this, the entire system is decreased in size while variation in spherical aberration and variation in axial chromatic aberration during zooming are suppressed.

The refractive power of the fourth lens unit L4 satisfies Conditional Expression (9). With this, the entire system is decreased in size while variation in spherical aberration and variation in axial chromatic aberration during zooming are suppressed and the image stabilization sensitivity is appropriately set.

The zoom lens of Embodiment 2 is the same as that of Embodiment 1 in zoom type including the number of lens units, the sign of the refractive power of each lens unit, and the like. The first lens unit L1, the second lens unit L2, the third lens unit L3, the fourth lens unit L4, the fifth lens unit L5, and the sixth lens unit L6 are configured to move toward the object side during zooming from the wide angle end to the telephoto end. The seventh lens unit L7 is configured not to move during zooming. A change in interval between each pair of lens units between the wide angle end and the telephoto end is the same as that of Embodiment 1. The optical action of each lens unit is also the same as that of Embodiment 1.

The zoom lens according to Embodiment 3 includes the following lens units, which are arranged in order from the object side to the image side: a first lens unit L1 having a positive refractive power, a second lens unit L2 having a negative refractive power, a third lens unit L3 having a positive refractive power, a fourth lens unit L4 having a positive refractive power, a fifth lens unit L5 having a negative refractive power, and a sixth lens unit L6 having a positive refractive power. Embodiment 3 relates to a six-unit zoom lens. A rear lens group LR includes the sixth lens unit L6 having a positive refractive power.

The first lens unit L1, the third lens unit L3, the fourth lens unit L4, and the fifth lens unit L5 are configured to move toward the object side, and the second lens unit L2 is configured to move toward the image side along a locus convex to the image side during zooming from the wide angle end to the telephoto end. The sixth lens unit L6 is configured not to move. The optical action of each lens unit from the first lens unit L1 to the fifth lens unit L5 is the same as that of Embodiment 1. The sixth lens unit L6 satisfies Conditional Expression (5). With this, the entire system is decreased in size while an incident angle of a light flux entering the image plane is restricted.

The zoom lens of Embodiment 4 includes the following lens units, which are arranged in order from the object side to the image side: a first lens unit L1 having a positive refractive power, a second lens unit L2 having a negative refractive power, a third lens unit L3 having a positive refractive power, a fourth lens unit L4 having a positive refractive power, a fifth lens unit L5 having a negative refractive power, and a sixth lens unit L6 having a negative refractive power. Embodiment 4 relates to a six-unit zoom lens. A rear lens group LR includes the sixth lens unit L6 having a negative refractive power.

The first lens unit L1, the third lens unit L3, the fourth lens unit L4, the fifth lens unit L5, and the sixth lens unit L6 are configured to move toward the object side during zooming from the wide angle end to the telephoto end. The second lens unit L2 is configured to move toward the object side along a locus convex to the image side. The optical action of each lens unit from the first lens unit L1 to the fifth lens unit L5 is the same as that of Embodiment 1. The sixth lens unit L6 satisfies Conditional Expression (5). With this, the entire system is decreased in size while an incident angle of a light flux entering the image plane is restricted.

A single-lens reflex camera as an embodiment of an image pickup apparatus according to the present invention illustrated in FIG. 17 is described. In FIG. 17, an interchangeable lens 10 includes a zoom lens 1 according to any one of Embodiments 1 to 4. The zoom lens 1 is held by a lens barrel 2, which is a holding member. A camera main body 20 includes a quick return mirror 3, which is configured to reflect a light flux from the interchangeable lens 10 upward, and a focusing plate 4, which is arranged in an image forming apparatus configured to form an image of the interchangeable lens 10. The camera main body 20 also includes a penta roof prism 5, which is configured to convert a reverse image formed on the focusing plate 4 into an erect image, an eyepiece lens 6, which is used to observe the erect image, and other such components.

As a photosensitive surface 7, there is arranged an image pickup element (photoelectric transducer) such as a CCD sensor or a CMOS sensor configured to receive the image formed by the zoom lens, or a silver-halide film. When an image is picked up, the quick return mirror 3 is retracted from an optical path, and an image is formed on the photosensitive surface 7 by the interchangeable lens 10.

The advantages described in Embodiments 1 to 4 are effectively provided to the image pickup apparatus disclosed in this embodiment. The image pickup apparatus can also be similarly applied to a mirrorless single-lens reflex camera which does not include a quick return mirror 3.

The image pickup optical systems according to the exemplary Embodiments of the present invention are described above, but needless to say, the present invention is not limited to those Embodiments, and various modifications and changes can be made thereto without departing from the gist of the present invention.

Specific numerical data of Embodiments 1 to 4 are described below. In each numerical data, i indicates the order from the object side, ri indicates the curvature radius of an i-th optical surface (i-th surface), di indicates an on-axis interval between the i-th surface and an (i+1)th surface, and ndi and νdi indicate the refractive index and Abbe number of a material of an optical member between the i-th surface and the (i+1)th surface with respect to the d-line, respectively. An aspherical shape is expressed by the following equation:

$$X = \frac{H^2/R}{1+\sqrt{1-(1+K)(H/R)^2}} + A4H^4 + A6H^6 + A8H^8 + A10H^{10}$$

where the X-axis represents an optical axis direction, the H-axis represents an axis in a direction perpendicular to the optical axis, a traveling direction of light is positive, R represents a paraxial curvature radius, K represents a conic constant, and A4, A6, A8, and A10 represent aspherical coefficients, respectively.

A symbol * assigned to a surface number indicates a surface having an aspherical shape. The notation "e-x" indicates $\times 10^{-x}$. The notation "BF" indicates an air-equivalent back focus. The total lens length is a value obtained by adding a value of the back focus BF to a distance from the first lens surface to the last lens surface. Moreover, a relationship between each of the conditional expressions given above and the numerical data is shown in Table 1.

(Numerical Data 1)
Unit mm

Surface data

| Surface number i | ri | di | ndi | νdi | Effective diameter |
|---|---|---|---|---|---|
| 1 | 198.873 | 1.50 | 1.91082 | 35.3 | 41.97 |
| 2 | 40.323 | 7.14 | 1.49700 | 81.5 | 37.84 |
| 3 | −264.154 | 0.15 | | | 36.51 |
| 4 | 46.385 | 4.93 | 1.76385 | 48.5 | 34.01 |
| 5 | −673.110 | (Variable) | | | 33.51 |
| 6 | 271.155 | 1.10 | 1.88300 | 40.8 | 22.30 |
| 7 | 12.848 | 5.33 | | | 17.35 |
| 8 | −21.984 | 0.90 | 1.77250 | 49.6 | 17.20 |
| 9 | 185.815 | 0.15 | | | 17.29 |
| 10 | 32.682 | 4.98 | 1.76182 | 26.5 | 17.43 |
| 11 | −21.267 | 0.37 | | | 17.09 |
| 12 | −17.949 | 0.80 | 1.77250 | 49.6 | 17.09 |
| 13 | −51.928 | (Variable) | | | 17.07 |
| 14 (Stop) | ∞ | 1.00 | | | 13.74 |
| 15* | 11.578 | 4.75 | 1.58313 | 59.4 | 15.02 |
| 16* | −80.796 | 1.54 | | | 14.38 |
| 17 | 36.810 | 0.80 | 1.88300 | 40.8 | 13.03 |
| 18 | 8.199 | 4.39 | 1.49700 | 81.5 | 11.75 |
| 19 | −163.069 | (Variable) | | | 11.56 |
| 20 | 35.246 | 3.44 | 1.80610 | 33.3 | 11.23 |
| 21 | −13.251 | 0.70 | 1.84666 | 23.8 | 11.00 |
| 22 | −116.680 | (Variable) | | | 10.84 |
| 23 | 134.572 | 1.80 | 1.78472 | 25.7 | 10.93 |
| 24 | −30.547 | 0.15 | | | 10.93 |
| 25 | −37.012 | 0.70 | 1.88300 | 40.8 | 10.87 |
| 26 | 17.298 | (Variable) | | | 10.88 |
| 27* | −38.909 | 1.40 | 1.52996 | 55.8 | 14.32 |
| 28* | −78.739 | (Variable) | | | 15.64 |
| 29 | −54.752 | 3.77 | 1.48749 | 70.2 | 25.34 |
| 30 | −24.401 | | | | 26.02 |

(Numerical Data 1)
Unit mm

Aspherical surface data

Fifteenth surface

K = 0.00000e+000  A4 = −4.51435e−005  A6 = 3.49602e−009
A8 = −3.37383e−009  A10 = 1.18237e−011

Sixteenth surface

K = 0.00000e+000  A4 = 3.21894e−005  A6 = 2.02765e−007
A8 = −4.59069e−009  A10 = 4.09901e−011

Twenty-seventh surface

K = 0.00000e+000  A4 = −2.43806e−004  A6 = −8.65291e−007
A8 = 1.39952e−008  A10 = −5.71046e−011

Twenty-eighth surface

K = 0.00000e+000  A4 = −1.91852e−004  A6 = −2.19312e−007
A8 = 9.88639e−009  A10 = −2.84875e−011

Various data
Zoom ratio 9.41

|  | Wide angle | Intermediate | Telephoto |
|---|---|---|---|
| Focal length | 15.45 | 49.96 | 145.34 |
| F-number | 3.40 | 5.69 | 6.46 |
| Half angle of view (degree) | 38.52 | 13.83 | 4.84 |
| Image height | 12.30 | 12.30 | 12.30 |
| Total lens length | 103.56 | 119.51 | 145.46 |
| BF | 10.50 | 10.50 | 10.50 |
| d5 | 0.90 | 14.60 | 39.65 |
| d13 | 26.78 | 8.35 | 2.01 |
| d19 | 3.00 | 3.72 | 1.41 |
| d22 | 1.51 | 4.85 | 3.11 |
| d26 | 8.08 | 4.02 | 8.08 |
| d28 | 1.00 | 21.71 | 28.95 |

Zoom lens unit data

| Unit | First surface | Focal length | Lens structure length | Front principal point position | Rear principal point position |
|---|---|---|---|---|---|
| 1 | 1 | 70.12 | 13.71 | 7.46 | −0.90 |
| 2 | 6 | −13.84 | 13.64 | 0.61 | −9.92 |
| 3 | 14 | 23.66 | 12.48 | −0.78 | −9.19 |
| 4 | 20 | 37.27 | 4.14 | 0.40 | −1.90 |
| 5 | 23 | −23.48 | 2.65 | 1.87 | 0.32 |
| 6 | 27 | −146.93 | 1.40 | −0.90 | −1.83 |
| 7 | 29 | 86.77 | 3.77 | 4.39 | 1.96 |

Single lens data

| Lens | First surface | Focal length |
|---|---|---|
| 1 | 1 | −55.78 |
| 2 | 2 | 70.94 |
| 3 | 4 | 56.98 |
| 4 | 6 | −15.30 |
| 5 | 8 | −25.40 |
| 6 | 10 | 17.62 |
| 7 | 12 | −35.88 |
| 8 | 15 | 17.70 |
| 9 | 17 | −12.11 |
| 10 | 18 | 15.84 |
| 11 | 20 | 12.34 |
| 12 | 21 | −17.71 |
| 13 | 23 | 31.88 |
| 14 | 25 | −13.27 |
| 15 | 27 | −146.93 |
| 16 | 29 | 86.77 |

(Numerical Data 2)
Unit mm

Surface data

| Surface number i | ri | di | ndi | vdi | Effective diameter |
|---|---|---|---|---|---|
| 1 | 182.490 | 1.50 | 1.91082 | 35.3 | 41.81 |
| 2 | 40.390 | 6.96 | 1.49700 | 81.5 | 37.73 |
| 3 | −334.389 | 0.15 |  |  | 36.44 |
| 4 | 46.123 | 5.37 | 1.76385 | 48.5 | 36.28 |
| 5 | −1009.243 | (Variable) |  |  | 35.77 |
| 6 | 188.791 | 1.10 | 1.83481 | 42.7 | 21.39 |
| 7 | 12.282 | 4.86 |  |  | 16.53 |
| 8 | −23.669 | 0.90 | 1.88300 | 40.8 | 16.36 |
| 9 | 117.175 | 0.68 |  |  | 16.31 |
| 10 | 32.609 | 5.80 | 1.78472 | 25.7 | 16.42 |
| 11 | −22.439 | 0.41 |  |  | 15.92 |
| 12 | −17.879 | 0.80 | 1.77250 | 49.6 | 15.92 |
| 13 | −48.031 | (Variable) |  |  | 15.96 |
| 14 (Stop) | ∞ | 1.00 |  |  | 13.20 |
| 15* | 11.948 | 4.15 | 1.58313 | 59.4 | 14.36 |
| 16* | −181.947 | 2.21 |  |  | 13.84 |
| 17 | 43.363 | 0.80 | 1.88300 | 40.8 | 12.60 |
| 18 | 8.701 | 4.16 | 1.49700 | 81.5 | 11.63 |
| 19 | −50.521 | (Variable) |  |  | 11.57 |
| 20 | 28.134 | 3.07 | 1.63854 | 55.4 | 11.22 |
| 21 | −21.933 | 0.70 | 1.90366 | 31.3 | 11.04 |
| 22 | −55.997 | (Variable) |  |  | 11.13 |
| 23 | 64.637 | 1.44 | 1.85478 | 24.8 | 11.27 |
| 24 | 1932.258 | 0.15 |  |  | 11.21 |
| 25 | 189.424 | 0.70 | 1.77250 | 49.6 | 11.19 |
| 26 | 14.844 | (Variable) |  |  | 11.09 |
| 27* | −16.820 | 1.40 | 1.52996 | 55.8 | 14.29 |
| 28* | −28.684 | (Variable) |  |  | 15.59 |
| 29 | −54.143 | 3.81 | 1.51633 | 64.1 | 25.29 |
| 30 | −24.120 |  |  |  | 26.00 |

Aspherical surface data

Fifteenth surface

K = 0.00000e+000  A4 = −3.45334e−005  A6 = −1.26495e−008
A8 = −1.60788e−009  A10 = 4.51942e−012

Sixteenth surface

K = 0.00000e+000  A4 = 3.00782e−005  A6 = 1.18316e−007
A8 = −2.15861e−009  A10 = 2.03658e−011

Twenty-seventh surface

K = 0.00000e+000  A4 = 3.18319e−005  A6 = −2.00662e−007
A8 = −5.37809e−009  A10 = 1.18688e−010

Twenty-eighth surface

K = 0.00000e+000  A4 = 5.01150e−005  A6 = −2.76469e−007
A8 = −3.38645e−010  A10 = 3.46028e−011

Various data
Zoom ratio 8.45

|  | Wide angle | Intermediate | Telephoto |
|---|---|---|---|
| Focal length | 15.45 | 50.00 | 130.49 |
| F-number | 3.51 | 5.82 | 6.47 |
| Half angle of view (degree) | 38.52 | 13.82 | 5.38 |
| Image height | 12.30 | 12.30 | 12.30 |
| Total lens length | 103.56 | 120.68 | 145.50 |

-continued (Numerical Data 2)
Unit mm

| | | | |
|---|---|---|---|
| BF | 10.52 | 10.52 | 10.52 |
| d5 | 0.90 | 15.27 | 39.37 |
| d13 | 24.90 | 6.92 | 2.00 |
| d19 | 3.87 | 3.61 | 1.87 |
| d22 | 1.60 | 5.74 | 3.60 |
| d26 | 8.57 | 4.68 | 8.57 |
| d28 | 1.11 | 21.81 | 27.47 |

Zoom lens unit data

| Unit | First surface | Focal length | Lens structure length | Front principal point position | Rear principal point position |
|---|---|---|---|---|---|
| 1 | 1 | 71.68 | 13.98 | 7.14 | -1.38 |
| 2 | 6 | -13.58 | 14.55 | 0.57 | -10.64 |
| 3 | 14 | 24.45 | 12.32 | -0.03 | -8.97 |
| 4 | 20 | 37.72 | 3.77 | 0.51 | -1.76 |
| 5 | 23 | -29.20 | 2.29 | 1.90 | 0.55 |
| 6 | 27 | -80.00 | 1.40 | -1.35 | -2.31 |
| 7 | 29 | 80.76 | 3.81 | 4.34 | 1.93 |

Single lens data

| Lens | First surface | Focal length |
|---|---|---|
| 1 | 1 | -57.24 |
| 2 | 2 | 72.96 |
| 3 | 4 | 57.87 |
| 4 | 6 | -15.78 |
| 5 | 8 | -22.23 |
| 6 | 10 | 17.76 |
| 7 | 12 | -37.30 |
| 8 | 15 | 19.38 |
| 9 | 17 | -12.46 |
| 10 | 18 | 15.29 |
| 11 | 20 | 19.77 |
| 12 | 21 | -40.29 |
| 13 | 23 | 78.21 |
| 14 | 25 | -20.89 |
| 15 | 27 | -80.00 |
| 16 | 29 | 80.76 |

(Numerical Data 3)
Unit mm

Surface data

| Surface number i | ri | di | ndi | vdi | Effective diameter |
|---|---|---|---|---|---|
| 1 | 107.433 | 1.50 | 1.91082 | 35.3 | 40.65 |
| 2 | 39.554 | 5.92 | 1.49700 | 81.5 | 38.39 |
| 3 | 215.316 | 0.15 | | | 38.27 |
| 4 | 47.216 | 5.27 | 1.76385 | 48.5 | 38.21 |
| 5 | 679.083 | (Variable) | | | 37.63 |
| 6 | 74.270 | 1.10 | 1.83481 | 42.7 | 24.32 |
| 7 | 12.936 | 5.72 | | | 19.06 |
| 8 | -33.796 | 0.90 | 1.88300 | 40.8 | 18.94 |
| 9 | 127.091 | 0.64 | | | 18.87 |
| 10 | 30.357 | 4.57 | 1.78472 | 25.7 | 19.01 |
| 11 | -32.370 | 0.59 | | | 18.60 |
| 12 | -23.071 | 0.80 | 1.77250 | 49.6 | 18.60 |
| 13 | -83.564 | (Variable) | | | 18.37 |
| 14 (Stop) | ∞ | 1.00 | | | 12.91 |
| 15* | 11.494 | 3.92 | 1.58313 | 59.4 | 13.98 |
| 16* | 209.972 | 2.47 | | | 13.40 |
| 17 | 43.488 | 0.80 | 1.88300 | 40.8 | 12.21 |
| 18 | 8.426 | 4.05 | 1.49700 | 81.5 | 11.31 |
| 19 | -58.362 | (Variable) | | | 11.35 |
| 20 | 24.617 | 3.11 | 1.63854 | 55.4 | 11.28 |
| 21 | -23.283 | 0.70 | 1.90366 | 31.3 | 11.30 |

-continued (Numerical Data 3)
Unit mm

| | | | | | |
|---|---|---|---|---|---|
| 22 | -68.315 | (Variable) | | | 11.47 |
| 23 | -156.911 | 1.60 | 1.85478 | 24.8 | 11.67 |
| 24 | -34.241 | 2.78 | | | 11.79 |
| 25 | -28.890 | 0.70 | 1.77250 | 49.6 | 11.48 |
| 26* | 17.744 | (Variable) | | | 11.74 |
| 27 | -32.373 | 3.88 | 1.51633 | 64.1 | 23.82 |
| 28 | -20.000 | | | | 24.91 |

Aspherical surface data

Fifteenth surface

K = 0.00000e+000  A4 = -3.12723e-005  A6 = -1.23113e-008
A8 = -2.06526e-009  A10 = 3.60303e-013

Sixteenth surface

K = 0.00000e+000  A4 = 2.58203e-005  A6 = 1.01409e-007
A8 = -1.90789e-009  A10 = 1.32410e-011

Twenty-sixth surface

K = 0.00000e+000  A4 = 2.94356e-005  A6 = -1.65287e-007
A8 = -3.33203e-009  A10 = 2.63615e-011

Various data
Zoom ratio 7.05

| | Wide angle | Intermediate | Telephoto |
|---|---|---|---|
| Focal length | 18.50 | 50.00 | 130.50 |
| F-number | 3.79 | 5.76 | 6.46 |
| Half angle of view (degree) | 36.44 | 15.28 | 5.98 |
| Image height | 13.66 | 13.66 | 13.66 |
| Total lens length | 104.55 | 111.46 | 146.48 |
| BF | 10.50 | 10.50 | 10.50 |
| d5 | 1.00 | 13.27 | 47.10 |
| d13 | 26.85 | 7.19 | 2.00 |
| d19 | 4.17 | 0.80 | 0.80 |
| d22 | 1.54 | 6.22 | 4.17 |
| d26 | 8.31 | 21.31 | 29.73 |

Zoom lens unit data

| Unit | First surface | Focal length | Lens structure length | Front principal point position | Rear principal point position |
|---|---|---|---|---|---|
| 1 | 1 | 91.81 | 12.84 | 4.75 | -3.15 |
| 2 | 6 | -16.71 | 14.33 | 1.01 | -10.01 |
| 3 | 14 | 27.94 | 12.24 | -1.21 | -9.89 |
| 4 | 20 | 36.21 | 3.81 | 0.31 | -1.99 |
| 5 | 23 | -21.17 | 5.08 | 5.26 | 1.01 |
| 6 | 27 | 91.57 | 3.88 | 6.05 | 3.74 |

Single lens data

| Lens | First surface | Focal length |
|---|---|---|
| 1 | 1 | -69.46 |
| 2 | 2 | 96.42 |
| 3 | 4 | 66.19 |
| 4 | 6 | -18.92 |
| 5 | 8 | -30.16 |
| 6 | 10 | 20.62 |
| 7 | 12 | -41.49 |
| 8 | 15 | 20.70 |
| 9 | 17 | -11.96 |
| 10 | 18 | 15.12 |
| 11 | 20 | 19.23 |
| 12 | 21 | -39.38 |
| 13 | 23 | 50.93 |

(Numerical Data 3)
Unit mm

| | | |
|---|---|---|
| 14 | 25 | −14.14 |
| 15 | 27 | 91.57 |

(Numerical Data 4)
Unit mm

Surface data

| Surface number i | ri | di | ndi | vdi | Effective diameter |
|---|---|---|---|---|---|
| 1 | 106.598 | 1.50 | 1.91082 | 35.3 | 40.62 |
| 2 | 36.423 | 6.11 | 1.49700 | 81.5 | 36.53 |
| 3 | 253.154 | 0.15 | | | 36.34 |
| 4 | 43.322 | 5.33 | 1.76385 | 48.5 | 36.42 |
| 5 | 977.649 | (Variable) | | | 35.90 |
| 6 | 97.697 | 1.10 | 1.83481 | 42.7 | 24.29 |
| 7 | 12.316 | 5.83 | | | 18.72 |
| 8 | −33.346 | 0.90 | 1.88300 | 40.8 | 18.62 |
| 9 | 84.377 | 0.87 | | | 18.70 |
| 10 | 31.920 | 4.53 | 1.78472 | 25.7 | 19.17 |
| 11 | −33.501 | 0.16 | | | 18.94 |
| 12 | −30.150 | 0.80 | 1.77250 | 49.6 | 18.94 |
| 13 | −70.824 | (Variable) | | | 18.83 |
| 14 (Stop) | ∞ | 1.00 | | | 13.19 |
| 15* | 11.376 | 4.22 | 1.58313 | 59.4 | 13.96 |
| 16* | −119.159 | 2.76 | | | 13.34 |
| 17 | −293.303 | 0.80 | 1.88300 | 40.8 | 11.67 |
| 18 | 8.787 | 4.17 | 1.49700 | 81.5 | 10.93 |
| 19 | −26.291 | (Variable) | | | 11.05 |
| 20 | 26.902 | 2.83 | 1.69680 | 55.5 | 10.81 |
| 21 | −30.073 | 0.70 | 1.90366 | 31.3 | 10.80 |
| 22 | −117.954 | (Variable) | | | 10.88 |
| 23 | 36.458 | 2.10 | 1.80000 | 29.8 | 11.22 |
| 24 | −31.416 | 0.22 | | | 11.19 |
| 25 | −27.170 | 0.70 | 1.77250 | 49.6 | 11.14 |
| 26* | 14.304 | (Variable) | | | 11.10 |
| 27 | 604.082 | 0.70 | 1.83400 | 37.2 | 14.79 |
| 28 | 34.422 | 3.21 | | | 15.32 |
| 29 | 22.568 | 3.98 | 1.48749 | 70.2 | 21.91 |
| 30 | 95.890 | | | | 22.36 |

Aspherical surface data

Fifteenth surface

K = 0.00000e+000    A4 = −3.51251e−005    A6 = −4.07564e−008
A8 = −1.25007e−009    A10 = −1.73201e−011

Sixteenth surface

K = 0.00000e+000    A4 = 2.75794e−005    A6 = 8.34718e−008
A8 = −2.04727e−009    A10 = 3.94544e−012

Twenty-sixth surface

K = 0.00000e+000    A4 = −8.58392e−006    A6 = −7.04582e−008
A8 = 1.45526e−009    A10 = −7.98802e−011

Various data
Zoom ratio 7.05

| | Wide angle | Intermediate | Telephoto |
|---|---|---|---|
| Focal length | 18.50 | 50.00 | 130.44 |
| F-number | 3.73 | 5.31 | 6.47 |
| Half angle of view (degree) | 36.44 | 15.28 | 5.98 |
| Image height | 13.66 | 13.66 | 13.66 |
| Total lens length | 104.55 | 112.29 | 146.47 |
| BF | 10.50 | 19.69 | 37.01 |
| d5 | 1.00 | 17.18 | 42.59 |
| d13 | 27.12 | 6.50 | 2.00 |
| d19 | 2.02 | 0.80 | 1.61 |

(Numerical Data 4)
Unit mm

| | | | |
|---|---|---|---|
| d22 | 2.54 | 5.99 | 1.21 |
| d26 | 6.71 | 7.47 | 7.40 |

Zoom lens unit data

| Unit | First surface | Focal length | Lens structure length | Front principal point position | Rear principal point position |
|---|---|---|---|---|---|
| 1 | 1 | 81.59 | 13.09 | 5.26 | −2.79 |
| 2 | 6 | −17.34 | 14.19 | −0.23 | −12.17 |
| 3 | 14 | 28.63 | 12.95 | −1.37 | 10.80 |
| 4 | 20 | 37.60 | 3.53 | 0.16 | −1.89 |
| 5 | 23 | −30.94 | 3.02 | 3.26 | 1.34 |
| 6 | 27 | −195.63 | 7.89 | −7.42 | −14.06 |

Single lens data

| Lens | First surface | Focal length |
|---|---|---|
| 1 | 1 | −61.37 |
| 2 | 2 | 84.81 |
| 3 | 4 | 59.20 |
| 4 | 6 | −16.98 |
| 5 | 8 | −26.97 |
| 6 | 10 | 21.48 |
| 7 | 12 | −68.55 |
| 8 | 15 | 18.02 |
| 9 | 17 | −9.65 |
| 10 | 18 | 13.80 |
| 11 | 20 | 20.80 |
| 12 | 21 | −44.84 |
| 13 | 23 | 21.39 |
| 14 | 25 | −12.04 |
| 15 | 27 | −43.79 |
| 16 | 29 | 59.49 |

TABLE 1

| Conditional Expression | Embodiment 1 Positive, negative, positive, negative, positive | Embodiment 2 Positive, negative, positive, negative, positive | Embodiment 3 Positive, negative, positive, negative, positive | Embodiment 4 Positive, negative, positive, negative, negative |
|---|---|---|---|---|
| (1) f4/f3 | 1.5752 | 1.5427 | 1.2960 | 1.3133 |
| (2) \|R4a\|/f4 | 0.9457 | 0.7459 | 0.6798 | 0.7155 |
| (3) \|R4b\|/f4 | 3.1307 | 1.4845 | 1.8866 | 3.1371 |
| (4) −f5/fw | 1.5197 | 1.8900 | 1.1443 | 1.6724 |
| (5) fw/frw | 0.0817 | 0.0167 | 0.2020 | −0.0946 |
| (6) f1/fw | 4.5385 | 4.6395 | 4.9627 | 4.4103 |
| (7) −f2/fw | 0.8958 | 0.8790 | 0.9032 | 0.9373 |
| (8) f3/fw | 1.5314 | 1.5825 | 1.5103 | 1.5476 |
| (9) f4/fw | 2.4123 | 2.4414 | 1.9573 | 2.0324 |
| fw | 15.45 | 15.45 | 18.5 | 18.5 |
| ft | 145.34 | 130.49 | 130.5 | 130.44 |
| f1 | 70.12 | 71.68 | 91.81 | 81.59 |
| f2 | −13.84 | −13.58 | −16.71 | −17.34 |
| f3 | 23.66 | 24.45 | 27.94 | 28.63 |
| f4 | 37.27 | 37.72 | 36.21 | 37.6 |
| f5 | −23.48 | −29.2 | −21.17 | −30.94 |
| frw | 189.219 | 922.612 | 91.57 | −195.63 |
| R1 | 35.246 | 28.134 | 24.617 | 26.902 |
| R2 | −116.68 | −55.997 | −68.315 | −117.954 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-093106, filed May 6, 2016, which is hereby incorporated by reference herein in its entirety.

What is claimed is:

1. A zoom lens, comprising, in order from an object side to an image side:
    a first lens unit having a positive refractive power;
    a second lens unit having a negative refractive power;
    a third lens unit having a positive refractive power;
    a fourth lens unit having a positive refractive power;
    a fifth lens unit having a negative refractive power; and
    a rear lens group including one or more lens units,
    wherein an interval between each pair of adjacent lens units is changed during zooming,
    wherein the third lens unit is configured to move toward the object side during zooming from a wide angle end to a telephoto end,
    wherein the fourth lens unit has a positive lens and a negative lens and is configured to move, as a whole, in a direction having a vertical component with respect to an optical axis during image stabilization, and
    wherein the following conditional expressions are satisfied:

$1.2 < f4/f3 < 3.0$, and $0.7 < -f2/fw < 1.2$, where f3 represents a focal length of the third lens unit, f4 represents a focal length of the fourth lens unit, f2 represents a focal length of the second lens unit, and fw represents a focal length of the zoom lens at the wide angle end.

2. The zoom lens according to claim 1, wherein the fourth lens unit consists of three or less lenses.

3. The zoom lens according to claim 1, wherein an interval between the third lens unit and the fourth lens unit is narrower at the telephoto end than at the wide angle end.

4. The zoom lens according to claim 1, wherein the following conditional expressions are satisfied:

$0.5 < |R4a|/f4 < 1.5$; and $1.0 < |R4b|/f4 < 5.0$, where R4a represents a curvature radius of a lens surface of the fourth lens unit that is closest to the object side, and R4b represents a curvature radius of a lens surface of the fourth lens unit that is closest to the image side.

5. The zoom lens according to claim 1, wherein the following conditional expression is satisfied:

$1.0 < -f5/fw < 2.5$, where f5 represents a focal length of the fifth lens unit.

6. The zoom lens according to claim 1, wherein the following conditional expression is satisfied:

$-0.3 < fw/frw < 0.4$, where frw represents a focal length of the rear lens group at the wide angle end.

7. The zoom lens according to claim 1, wherein the fifth lens unit is configured to move toward the image side during focusing from infinity to close proximity.

8. The zoom lens according to claim 1, wherein the fifth lens unit consists of two lenses.

9. The zoom lens according to claim 1, wherein the following conditional expression is satisfied:

$3.5 < f1/fw < 6.0$, where f1 represents a focal length of the first lens unit.

10. The zoom lens according to claim 1, wherein the following conditional expression is satisfied:

$1.0 < f3/fw < 2.0$.

11. The zoom lens according to claim 1, wherein the following conditional expression is satisfied:

$1.5 < f4/fw < 3.5$.

12. The zoom lens according to claim 1, wherein the rear lens group consists of, in order from the object side to the image side, a sixth lens unit having a negative refractive power, and a seventh lens unit having a positive refractive power.

13. The zoom lens according to claim 1, wherein the rear lens group consists of a sixth lens unit having a positive refractive power.

14. The zoom lens according to claim 1, wherein the rear lens group consists of a sixth lens unit having a negative refractive power.

15. An image pickup apparatus, comprising:
    a zoom lens; and
    an image pickup element configured to receive an image formed by the zoom lens,
    the zoom lens comprising, in order from an object side to an image side:
    a first lens unit having a positive refractive power;
    a second lens unit having a negative refractive power;
    a third lens unit having a positive refractive power;
    a fourth lens unit having a positive refractive power;
    a fifth lens unit having a negative refractive power; and
    a rear lens group including one or more lens units,
    wherein an interval between each pair of adjacent lens units is changed during zooming,
    wherein the third lens unit is configured to move toward the object side during zooming from a wide angle end to a telephoto end,
    wherein the fourth lens unit has a positive lens and a negative lens and is configured to move, as a whole, in a direction having a vertical component with respect to an optical axis during image stabilization, and
    wherein the following conditional expressions are satisfied:

$1.2 < f4/f3 < 3.0$, and $0.7 < -f2/fw < 1.2$, where f3 represents a focal length of the third lens unit, f4 represents a focal length of the fourth lens unit, f2 represents a focal length of the second lens unit, and fw represents a focal length of the zoom lens at the wide angle end.

16. The zoom lens according to claim 1, wherein the following conditional expression is satisfied:

$1.2960 \leq f4/f3 < 3.0$.

* * * * *